United States Patent
Aito et al.

[11] Patent Number: 5,991,689
[45] Date of Patent: Nov. 23, 1999

[54] NAVIGATION SYSTEM WITH SWITCHING BETWEEN AN ORDINARY ROAD PREFERENTIAL MODE AND A TALL ROAD PREFERENTIAL MODE

[75] Inventors: Satoru Aito; Masahiro Suetsugu; Toyoji Hiyokawa; Kazuteru Maekawa; Takeshi Yanagikubo, all of Anjo, Japan

[73] Assignee: Aisin AW Co., Ltd., Japan

[21] Appl. No.: 08/848,282

[22] Filed: Apr. 29, 1997

[30] Foreign Application Priority Data

Jun. 3, 1996 [JP] Japan .................................. 8-139834
Jul. 26, 1996 [JP] Japan .................................. 8-198172

[51] Int. Cl.⁶ .......................... G01C 21/00; G08G 1/137
[52] U.S. Cl. ......................... 701/209; 701/201; 701/210
[58] Field of Search .................................. 701/201, 209, 701/210, 211; 340/995

[56] References Cited

U.S. PATENT DOCUMENTS

| | | | |
|---|---|---|---|
| 4,758,959 | 7/1988 | Thoone et al. | 364/454 |
| 5,220,507 | 6/1993 | Kirson | 364/444 |
| 5,452,217 | 9/1995 | Kishi et al. | 364/449 |
| 5,568,390 | 10/1996 | Hirota et al. | 364/449 |
| 5,652,706 | 7/1997 | Morimoto et al. | 364/449.4 |
| 5,684,704 | 11/1997 | Okazaki | 364/444.2 |
| 5,774,073 | 6/1998 | Mackawa et al. | 340/995 |
| 5,793,631 | 8/1998 | Ito et al. | 364/449.5 |

FOREIGN PATENT DOCUMENTS 4232812 8/1992 Japan .
5341712 12/1993 Japan .

*Primary Examiner*—Michael J. Zanelli
*Attorney, Agent, or Firm*—Lorusso & Loud

[57] ABSTRACT

In a navigation apparatus for a vehicle, a route is determined in an ordinary-road-preferential mode or a toll-road-preferential mode, and route guidance is provided based on the thus-determined route. When the vehicle deviates from the determined route, redetermination is conducted so as to obtain a new route based on which guidance is provided. For example, when the vehicle has deviated from a route determined in the ordinary-road-preferential mode in order to enter a toll road, the user operates a toll-road-preference ON touch button so to change the determination mode to the toll-road preferential mode, so that route redetermination is carried out in a state in which priority is given to toll roads. In the navigation apparatus, optimum interchanges of a special road are automatically searched, and a route that preferentially uses the special road is calculated.

19 Claims, 19 Drawing Sheets

INTERSECTION DATA

| NUMBER OF INTERSECTIONS (k) | |
|---|---|
| 1 | INTERSECTION NUMBER |
| | INTERSECTION NAME |
| | TRAFFIC SIGNAL DATA |
| | PEDESTRIAN CROSSING DATA |
| | BRANCH POINT CHARACTERISTIC OBJECT DATA |
| | INCOMING ROAD DATA |
| | OUTGOING ROAD DATA |
| | LANDMARK DATA |
| ⋮ | ⋮ |
| k | |

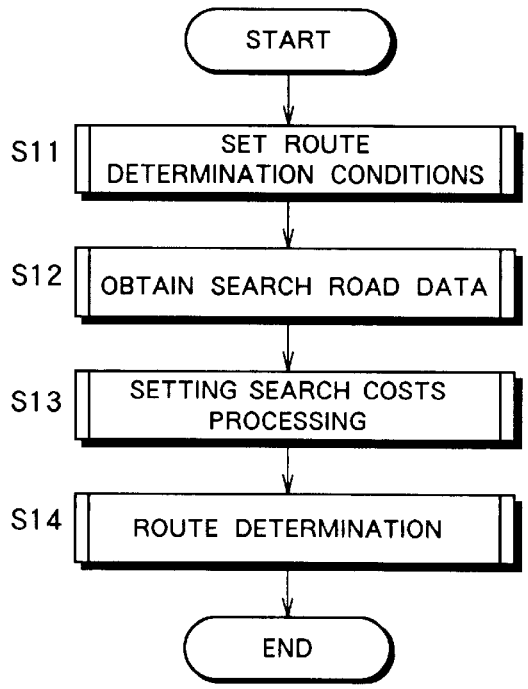
Fig. 5
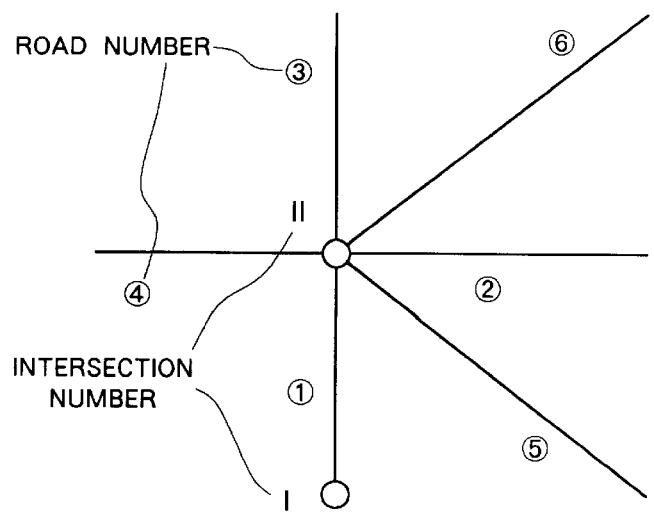
Fig. 6A
Fig. 6B

| | (1) NOT DESIGNATED | (2) SHORTEST TRAVEL TIME | (3) EASINESS OF TRAVEL |
|---|---|---|---|
| FACTOR OF KIND OF ROAD | 1 | 1 | 2 |
| FACTOR OF ROAD WIDTH | 1 | 1 | 2 |
| FACTOR OF RIGHT/LEFT TURN | 1 | 2 | 2 |
| FACTOR OF TRAFFIC SIGNAL | 1 | 2 | 1 |
| FACTOR OF LENGTH | 1 | 2 | 1 |
| FACTOR OF VEHICLE SPEED | 1 | 2 | 2 |

○ ○ ··· ROAD POINT  
⟶ ··· ARC

3635102 ··· POINT CODE  
(DESTINATION CODE)

NAVIGATION SYSTEM WITH SWITCHING BETWEEN AN ORDINARY ROAD PREFERENTIAL MODE AND A TALL ROAD PREFERENTIAL MODE

BACKGROUND OF THE INVENTION

1. Field of the Invention

The present invention relates to a navigation apparatus for a vehicle in which a route is determined in an ordinary-road-preferential mode or a toll-road-preferential mode, and route guidance is provided based on the determined route. The present invention also relates to a navigation apparatus for a vehicle in which when priority is given to toll roads, proper interchanges are located during route determination.

2. Description of the Related Art

In a conventional navigation apparatus, upon input of a destination and enroute points, there is determined an optimum route that starts from the present position of the vehicle or a preset start point and reaches the destination after passing through the enroute points, and based on the thus-determined route, route guidance is provided by means of voice output and display.

In such a navigation apparatus, road map data is stored in a CD-ROM, and the road data is utilized for determination of an optimal route and creation of a map to be displayed on a display screen.

In such a case, road data for route determination is stored for each road section between intersections or between branch points. Specifically, there are stored information peculiar to each road section and information representing connections (links) between the road sections. The information peculiar to each road section includes a road length, a road width, and a road attribute. During route determination, a search cost is determined through use of these pieces of information. The road attribute indicates a road type that is determined based on the actual road; i.e., a highway, a national road, a prefectural road, or an ordinary road. Especially, toll roads such as a highway are regarded as special roads and are distinguished from other types of roads.

When route determination is performed through use of such a navigation apparatus, a user can select a toll-road-preferential mode, or an ordinary-road-preferential mode for route determination. When route determination is performed in the toll-road-preferential mode, the route determination is carried out after the search costs of toll roads are decreased relative to the case were the route determination is carried out in the ordinary-road-preferential mode. This technique realizes an improved route determination in which a route is determined so as to include a toll road or roads if possible when priority is given to toll roads, whereas a route is determined so as to avoid toll roads if possible when priority is given to ordinary roads. As described above, depending on a user's preference, the route can be changed to some extent.

Moreover, in the above-described navigation apparatus, when the vehicle deviates from a predetermined route during route guidance, a new route from the present position of the vehicle to the destination is determined automatically or in response to an instruction from the user, to thereby provide proper route guidance.

However, the above-described conventional navigation apparatus cannot satisfy the user in the following cases. When the user causes the navigation apparatus to determine a route in the toll-road-preferential mode, a route passing through a toll road or roads is determined. However, the user may feel that using the toll road or roads is not necessary, for example, in the case where a major road extends along the toll road or roads.

Also, when the user causes the navigation apparatus to determine a route in the ordinary-road-preferential mode, there is determined an improper route in some cases, for example, a route passing through an old road that is difficult to drive on while a newly opened toll tunnel or the like is avoided. In such a case, the user feels that the route passing through the toll tunnel or the like is preferable if the toll is not very expensive. Moreover, when the user travels to an unfamiliar destination, it may be difficult for him or her to determine whether the route determination is to be performed in the toll-road-preferential mode, or in the ordinary-road-preferential mode.

In the above-described cases, it is preferred that the selection of mode between the toll-road-preferential mode and the ordinary-road-preferential mode be carried out automatically unless there is a demand for route determination in which a route is determined such that toll roads or ordinary roads are excluded completely.

The accuracy of navigation apparatuses in detecting the present position has improved drastically; accordingly, the possibility that the user mistakenly deviates from the route due to a detection error of the present position has decreased. When the user deviates a road deviated from the determined route, the user may use the road intentionally due to some reasons. For example, when the user leaves a route that has been determined in the ordinary-road-preferential mode and then enters a toll road, if the navigation apparatus is in a mode for automatic redetermination, a new route is determined based on the present position of the vehicle, or the present position on the toll road. However, in the conventional apparatus, there is determined a route that leaves the toll road immediately and enters an ordinary road, because if an initial determination is conducted in the ordinary-road-preferential mode, the redetermination is also conducted in the ordinary-road-preferential mode.

In the above-described case, the user determines the initial route while giving priority to ordinary roads and then during travel the user changes the route to use a toll road. Such route change is often performed when ordinary roads on the route have heavy traffic and the user expects to require an extremely long time to pass through the traffic; i.e., when the user's intention has changed. Of course, the user can change the operation mode from the ordinary-road-preferential mode to the toll-road-preferential mode. However, the operation for switching the operation mode is troublesome.

There are opposite cases where the user determines the initial route while giving priority to toll roads and then during travel the user changes the route to use an ordinary road. Such route change is often made when the user obtains information indicating presence of a traffic jam or traffic regulation ahead on the toll road presently used and wants to avoid such a situation. In such cases, since the operation mode has been set to the toll-road preferential mode, a new route is determined to cause the driver to use the toll road again, so that the user's will or intention of leaving the original route is not reflected in the new route determination.

Moreover, in the conventional navigation apparatus, when route determination is performed in the toll-road-preferential mode, there is output a route which causes the driver to use an interchange which seems to be closest to the start point or the destination (see, for example, Japanese Patent Applications Laid-Open (kokai) Nos. 4-232812 and 5-341712).

However, in such a conventional navigation apparatus, when a route determination is performed in the toll-road-preferential mode, an interchange located in the direction opposite the direction of a destination that the user desires to go is sometimes selected because of the proximity of the interchange. In such a case, the user feels that the determined route is a long way around, an excess amount of fuel is consumed, and the driver is forced to turn the vehicle in the opposite direction, thereby making the maneuvering of the vehicle troublesome. Similar problems occur in the vicinity of the destination.

SUMMARY OF THE INVENTION

In view of the foregoing problems, a first object of the present invention is to provide a navigation apparatus for a vehicle which makes it possible to determine properly and reasonably whether ordinary roads or toll roads are to be given priority during route determination.

A second object of the present invention is to provide a navigation apparatus for a vehicle which causes a vehicle to travel forward constantly and which can select proper interchanges of a special road, thereby making it possible to give priority to the special road.

In order to achieve the first object, the present invention provides an improved navigation apparatus for a vehicle which provides route guidance based on a preset route. The navigation apparatus comprises information storage means in which map information is stored; present position detection means for detecting the present position of a vehicle; input means for inputting a start point, a destination and an enroute point and for designating, as a determination mode, an ordinary-road-preferential mode or a toll-road-preferential mode; route determination means for determining a route based on the map information stored in the information storage means and the determination condition input by the input means, the route starting from the present position of the vehicle detected by the present position determination means or the start point input by the input means and reaching the enroute point or the destination input by the input means; and control means for providing route guidance based on the route determined by the route determination means. When the vehicle has deviated from a route determined in the ordinary-road-preferential mode and starts traveling on a toll road while route guidance is being provided based on the determined route, the route determination means determines a new route to the destination or the enroute point after changing the determination mode from the ordinary-road-preferential mode to the toll-road-preferential mode.

In this case, a route obtained through redetermination utilizes toll roads effectively. In addition, there is prevented the determination of a new route that goes against the user's intention of using a toll road, or a new route that causes the vehicle to leave the toll road and use an ordinary road.

The present invention also provides another improved an improved navigation apparatus for a vehicle which provides route guidance based on a preset route. The navigation apparatus comprises information storage means in which map information is stored; present position detection means for detecting the present position of a vehicle; input means for inputting a start point, a destination and an enroute point and for designating, as a determination mode, an ordinary-road-preferential mode or a toll-road-preferential mode; route determination means for determining a route based on the map information stored in the information storage means and the determination condition input by the input means, the route starting from the present position of the vehicle detected by the present position determination means or the start point input by the input means and reaching the enroute point or the destination input by the input means; and control means for providing route guidance based on the route determined by the route determination means. When the vehicle has deviated from a route determined in the toll-road-preferential mode and starts traveling on an ordinary road while route guidance is being provided based on the determined route, the route determination means determines a new route to the destination or the enroute point after changing the determination mode from the toll-road-preferential mode to the ordinary-road-preferential mode.

Accordingly, route redetermination can be performed in accordance with the user's intention of changing, during a travel along an initial route determined in the toll-road-preferential mode, the determination mode to the ordinary-road preferential mode. In addition, when the vehicle is traveling on an ordinary road after leaving a toll road, there can be prevented the determination of a new route that causes the vehicle to return to the toll road.

In this case, when a new route obtained through redetermination while providing priority to ordinary roads is such that the distance to the enroute point or the destination is equal to or greater than a predetermined distance, route redetermination is preferably carried out after the determination mode is changed to the toll-road-preferential mode. Accordingly, a proper route can be obtained through redetermination, in consideration of the distance to the destination.

In order to achieve the first object, the present invention further provides a navigation apparatus for a vehicle, in which a route is determined in an ordinary-road-preferential mode or a toll-road-preferential mode, and route guidance is provided based on the thus-determined route, wherein when a route using a toll road is determined as a result of redetermination in the toll-road-preferential mode and the distance between the present position of the vehicle and an interchange through which the vehicle will enter the toll road is equal to or greater than a predetermined distance, route redetermination is carried out after the determination mode is changed to the ordinary-road-preferential mode. Accordingly, a proper route can be obtained through redetermination, in consideration of a merit that is obtained by giving priority to ordinary roads rather than toll roads.

The present invention further provides a navigation apparatus for a vehicle, in which a route is determined in an ordinary-road-preferential mode or a toll-road-preferential mode, route guidance is provided based on the thus-determined route, and when the vehicle deviates a road deviated from the determined route, redetermination is conducted so as to obtain a new route based on which guidance is provided, wherein when the vehicle leaves a toll road during travel along a route determined in the toll-road-preferential mode and starts traveling along an ordinary road, road determination is performed in both the ordinary-road-preferential mode and the toll-road-preferential mode, and search costs of roads determined in the two modes are compared with each other, and one of the ordinary-road-preferential mode and the toll-road-preferential mode is selected based on the result of the comparison.

Accordingly, reasonable route redetermination can be carried out in consideration of search costs.

In this case, it is preferred that the necessary time for travel of the route determined in the ordinary-road-preferential mode and the necessary travel time of the route determined in the toll-road-preferential mode be calculated, and when the necessary travel time of the route determined in the ordinary-road-preferential mode is shorter than a time that is obtained by multiplying the necessary travel time of the route determined in the toll-road-preferential mode by a predetermined factor, route redetermination be carried out in the ordinary-road-preferential mode. Accordingly, a proper route can be obtained through redetermination, in consideration of a merit that is obtained by giving priority to ordinary roads rather than toll roads.

It is also preferred that the ratio of the length of a toll road to the total length of a new route that is determined as a result of redetermination in the toll-road-preferential mode be calculated, and when the ratio is equal to or less than a predetermined value, route redetermination be carried out in the ordinary-road-preferential mode. Accordingly, reasonable route redetermination can be carried out taking account of road length.

In order to achieve the first object, the present invention further provides a navigation apparatus for a vehicle, in which a route is determined in an ordinary-road-preferential mode or a toll-road-preferential mode, route guidance is provided based on the thus-determined route, and when the vehicle deviates a road deviated from the determined route, redetermination is conducted so as to obtain a new route based on which guidance is provided, wherein when the vehicle leaves a toll road halfway during travel along a route that has been determined in the toll-road-preferential mode and starts traveling along an ordinary road in a state in which there is received traffic information that reports traffic jam or the like at a location on the toll road ahead of an interchange through which the vehicle has left the toll road, route redetermination is carried out in the ordinary-road-preferential mode.

In this case, proper route redetermination can be carried out in consideration of road conditions. For example, when the driver has received information reporting a traffic jam on a toll road ahead of the vehicle and he or she has left the toll road in order to use an ordinary road, there is prevented determination of a new route that causes the vehicle to return to the toll road immediately.

In order to achieve the first object, the present invention further provides a navigation apparatus for a vehicle, in which a route is determined in an ordinary-road-preferential mode or a toll-road-preferential mode, and route guidance is provided based on the thus-determined route, wherein the necessary time of travel of the route determined in the ordinary-road-preferential mode and the necessary time of travel of the route determined in the toll-road-preferential mode are calculated, and when the necessary travel time of the route determined in the ordinary-road-preferential mode is shorter than a time that is obtained by multiplying the necessary travel time of the route determined in the toll-road-preferential mode by a predetermined factor, route redetermination is carried out in the ordinary-road-preferential mode.

In this case, a route from a start point to a destination can be obtained through redetermination in consideration of time required.

In order to achieve the first object, the present invention further provides a navigation apparatus for a vehicle, in which a route is determined in an ordinary-road-preferential mode or a toll-road-preferential mode, and route guidance is provided based on the thus-determined route, wherein the ratio of the length of a toll road to the total length of a new route that is determined as a result of redetermination in the toll-road-preferential mode be calculated, and when the ratio is equal to or less than a predetermined value, route redetermination is carried out in the ordinary-road-preferential mode.

In this case, a route from a start point to a destination can be obtained through redetermination in consideration of the lengths of roads.

In order to achieve the second object, the present invention provides an improved navigation apparatus for a vehicle which provides route guidance based on a preset route. The navigation apparatus comprises present position detection means for detecting the present position of a vehicle; input means for inputting a start point, a destination and an enroute point; information storage means for storing data including search road data; means for giving weights to the search road data stored in the information storage means; interchange search range setting means for setting search ranges that extend from the start point and the destination, respectively, within predetermined angular ranges, based on the positional relationship between the start point and the destination; interchange search means for locating, from the search road data stored in the information storage means, interchanges of a special road located within the interchange search ranges set by the interchange search range setting means; weight changing means for changing the weight of search road data regarding a road between the interchanges located by the interchange search means; and route determination means for determining a route based on the search road data changed by the weight changing means.

Preferably, when no interchange has been located by the search, route determination is carried out in a mode in which priority is given to ordinary roads, and it is automatically judged whether priority is given to special roads or not.

Preferably, the predetermined angle range at the start point is determined such that it is sandwiched between two lines which are located on opposite sides of a straight line connecting the start point and the destination and each of which intersects the start point at a predetermined angle with respect to the straight line, and the predetermined angle range at the destination is determined such that it is sandwiched between two lines which are located on opposite sides of the straight line and each of which intersects the destination at a predetermined angle with respect to the straight line.

In this case, the predetermined angle is preferably an angle equal to or less than 90 degrees.

It is also preferred that an area be set in advance, it be judged whether the area includes a special road having interchanges, and when it is judged that the area includes the special road, an interchange be designated in the above-described manner for route determination.

In order to achieve the second object, the present invention provides another improved navigation apparatus for a vehicle which provides route guidance based on a preset route. The navigation apparatus comprises present position detection means for detecting the present position of a vehicle; input means for inputting a start point, a destination and an enroute point; information storage means for storing data including search road data; means for giving weights to the search road data stored in the information storage means; interchange search range setting means for setting search ranges that extend from the start point and the destination, respectively, within predetermined angular ranges, based on the positional relationship between the start point and the destination; interchange search means for locating, from the search road data stored in the information storage means, interchanges of a special road located within the interchange search ranges set by the interchange search range setting means; interchange designation means for designating, among the interchanges located by the interchange search means, optimal interchanges through which the vehicle enters the special road after leaving the start point and exits the special road so as to reach the destination; and route determination means for determining a route by using the interchanges designated by the interchange designation means.

In order to achieve the second object, the present invention also provides still another improved navigation apparatus for a vehicle which provides route guidance based on a preset route. The navigation apparatus comprises present position detection means for detecting the present position of a vehicle; input means for inputting a start point, a destination and an enroute point; information storage means for storing data including search road data; means for giving weights to the search road data stored in the information storage means; interchange search range setting means for setting search ranges that extend from the start point and the destination, respectively, within predetermined angular ranges, based on the positional relationship between the start point and the destination; interchange search area setting means for setting areas included within the interchange search ranges set by the interchange search range setting means; interchange search means for locating, from the search road data stored in the information storage means, interchanges of a special road located within the interchange search areas set by the interchange search area setting means; interchange designation means for designating, among the interchanges located by the interchange search means, optimal interchanges through which the vehicle enters the special road after leaving the start point and exits the special road so as to reach the destination; and route determination means for determining a route by using the interchanges designated by the interchange designation means.

In this case, it is preferred that the interchange search areas be semicircular areas. The semicircular areas each have a predetermined radius, are centered at the start point and the destination, respectively, and have reference lines that are perpendicular to a line connecting the start point and the destination and pass through the start point and the destination, respectively.

In this case, it is also preferred that the interchange search area is an area sandwiched between two parallel lines. The areas is sandwiched by lines which are parallel to lines respectively intersecting a start point and a destination at right angles with respect to a line connecting the start point and the destination and which are respectively separated from the start point and the destination by a predetermined amount.

The above-described navigation apparatus embodiments that achieve the second object of the present invention have the following advantages:

(A) It becomes possible to determine a route which allows the driver to reach a destination more quickly.

(B) Since route guidance is provided to cause the vehicle to head constantly toward a destination or an enroute point, the user does not feel that he or she goes a long way around.

(C) Since the user can reach a destination more quickly (i.e., the number of stops and starts decreases, and the length of a section at which the user can travel at high speed increases), fuel consumption can be improved, and the frequency of various kinds of vehicle maintenance, such as engine maintenance, can be decreased.

(D) Since it becomes unnecessary to make selection as to whether priory is given to special roads, setting operation for route determination can be simplified.

BRIEF DESCRIPTION OF THE DRAWINGS

The structure and features of the navigation apparatus for a vehicle according to the present invention will be readily appreciated as the same becomes better understood by referring to the drawings, in which:

FIG. 5 is a flowchart showing a first route determination subroutine according to the present invention;

FIG. 6 is an explanatory diagram showing route data according to the present invention;

DESCRIPTION OF THE PREFERRED EMBODIMENTS

Embodiments of the present invention will next be described in detail with reference to the drawings.

Figure 1:
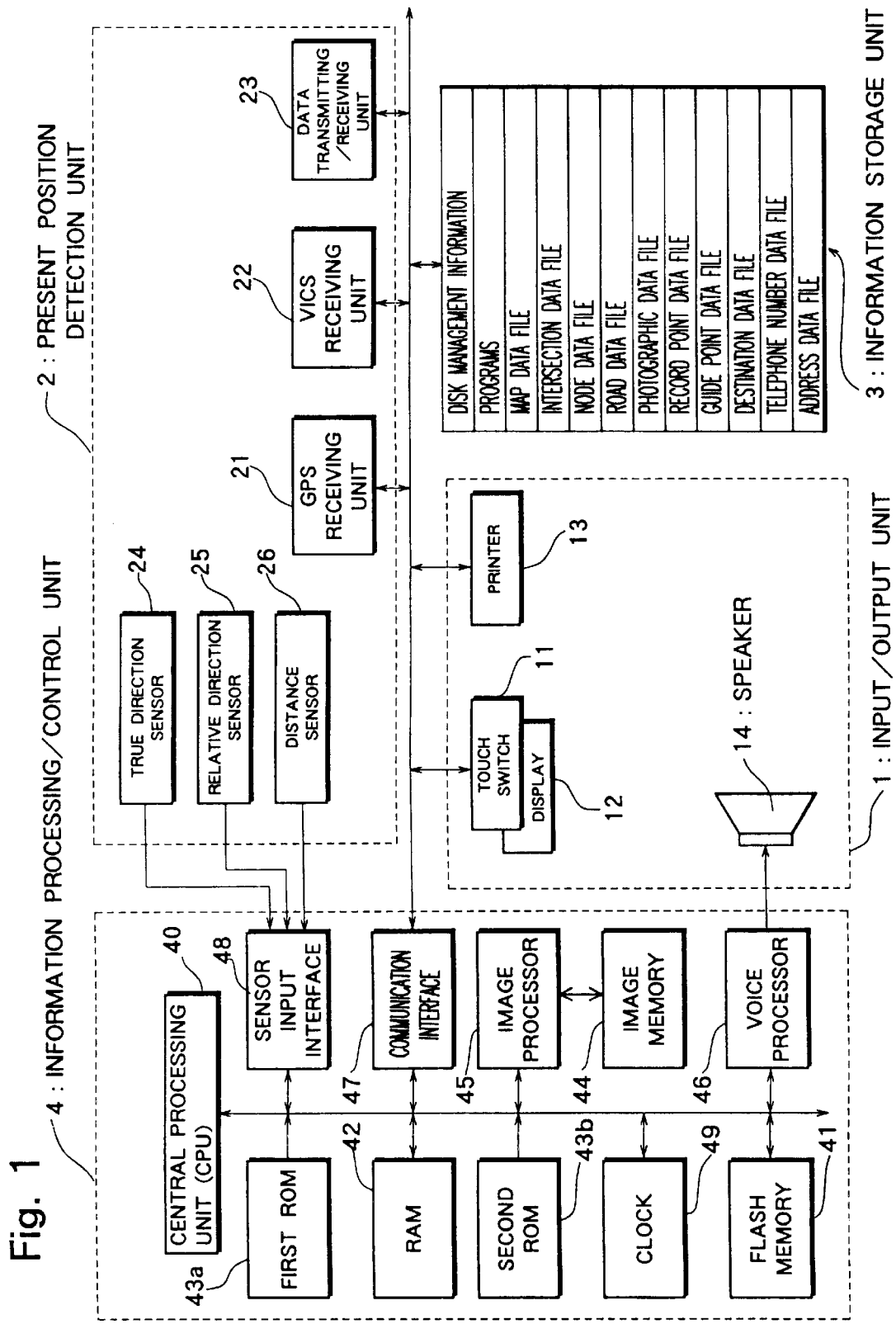
FIG. 1 is a block diagram showing the overall structure of a navigation apparatus for a vehicle according to the present invention.

FIG. 1 is a block diagram showing the overall structure of a navigation apparatus to which the present invention is applied.

This navigation apparatus is composed of an input/output unit 1 for inputting and outputting information regarding route guidance; a present position detection unit 2 for detecting or receiving information regarding the present position of the vehicle; an information storage unit 3 which stores therein navigation data required for route calculation, display/voice guidance data required for route guidance, and programs (OS and/or application programs); and an information processing/control unit 4 which carries out processing for route determination, display/voice guidance processing required for route guidance, and which controls the entire system. First, the structures of these units will be described.

The input/output unit 1 is used to input a destination and the like and to provide guidance information by voice and/or through a display screen when a user needs the guidance information. For that purpose, the input/output unit 1 has the function of allowing a user to command the information processing/control unit 4 to carry out navigation processing in accordance with the use's will, as well as the function of printing out the data which has undergone the subroutines. In order to realize these functions, the input section includes a touch switch 11 and an unillustrated operation switch used for inputting a destination through use of a telephone number or coordinates on a map and for requesting route guidance. Needless to say, other types of input devices such as a remote control may be used.

The output section includes a display 12 which displays input data and automatically displays route guidance information in response to a user's request, a printer 13 for printing out data which has undergone processing by the information processing/control unit 4 and data stored in the information storage unit 3, and a speaker 14 for providing route guidance by voice.

There may be added a voice recognition unit for allowing voice input and a record card reader for reading out data recorded on an IC card or a magnetic card. Moreover, a data communication unit may be added so as to exchange data with information sources such as a personal computer in which data peculiar to the user such as map data and destination data are stored in advance.

The display 12 is composed of a color CRT or a color liquid-crystal display. The display 12 color-displays all screens required for navigation such as a route setting screen, a road section screen, an intersection screen, and the like, which are created based on map data and guidance data obtained from the processing by the information processing/control unit 4. Moreover, there are displayed buttons for carrying out setting of route guidance and for switching guidance and screens during route guidance. Among items to be displayed, information regarding intersections to be passed therethrough such as names of the intersections are color-displayed on a road section screen in a popped up manner whenever necessary.

The display 12 is installed within an instrument panel in the vicinity of a driver's seat. The user can confirm the present position of the vehicle by looking at a displayed map, and can obtain information regarding the route. The display 12 is provided with a touch switch (input device) 11 having touching areas corresponding to function buttons displayed on the screen. When the user touches an area corresponding to a button, a signal is input to the information processing/control unit 4, so that the above-described operation is performed based on the input signal. The input signal generation means composed of the buttons and the touch switch 11 constitutes the input section. In this specification, a detailed description therefor will be omitted.

The present position detection unit 2 serves to detect or receive information regarding the present position of the vehicle and includes a true direction sensor 24 composed of a geomagnetic sensor or the like, a relative direction sensor 25 composed of a steering sensor, a gyro or the like, a distance sensor 26 for detecting a travel distance from the number of rotations of the wheels, a GPS receiving unit 21 utilizing a global positioning system (GPS), and traffic information obtaining means which is composed of a VICS receiving unit 22 or a data transmitting/receiving unit 23.

The VICS receiving unit 22 receives road traffic information through FM multiplex, radio beacon, or light beacon, whereas the data transmitting/receiving unit 23 is composed of, for example, a portable phone or a personal computer, and upon a user's request, exchanges information necessary for navigation with a traffic information center (for example, ATIS).

The information storage unit 3 is an external storage unit such as a CD-ROM (hereinafter referred to as a "CD"), an optical CD, an IC card, or the like, in which a navigation program and data are stored. The navigation program includes a map depicting section, a route determination section, a route guidance section, a present position calculation section, a destination-setting-operation control section, and other sections. As viewed in a different manner, the navigation program is composed of application sections for carrying out signal processing for navigation, an OS section, and the like. In the information storage unit 3, there are stored a program for carrying out processing for route determination and the like, programs and data required for controlling display output for route guidance and for controlling voice output for voice guidance, and display information data required for route guidance and map display. The data include all kinds of data required for navigation such as map data, intersection data, road data and various kinds of guidance data.

More specifically, the information storage unit 3 stores a program for setting a destination and enroute points based on positional information from the present position detection unit 2 and input signals from the input device 11 and for conducting route determination through use of search road data; a program for converting the search road data so as to carry out route redetermination when the vehicle deviates from a route; a program for depicting maps, for carrying out map matching, and for determining the timing of voice output along the route as well as the contents of phrases for voice output; and a program for selecting, for initial determination and redetermination, and based on various kinds of conditions, one of an ordinary-road-preferential mode and a toll-road-preferential mode. The various functions of the navigation apparatus of the present invention are realized through execution of these programs stored in the information storage unit 3. In other words, in the present embodiment, the programs which realize the functions of the present invention are stored in the information storage unit 3, which is an external storage medium.

The information processing/control unit 4 includes a CPU (Central Processing Unit) 40 for carrying out a variety of kinds of operational processing, and a flash memory 41 for reading out programs from a CD of the information storage unit 3 so as to store the programs. The flash memory 41 makes it possible to erase all the existing programs simultaneously and to rewrite new programs upon replacement of the CD. The information processing/control unit 4 further includes a first ROM 43a which stores a program for updating subroutines (means for reading in a program); a RAM 42 for temporarily storing the coordinates of a preset destination, guidance information of a determined route such as a road code No., and data under calculation processing; and a second ROM 43b which stores display information data required for route guidance and map display. The program for updating processing may be stored in the external storage unit.

All the programs that realize the functions according to the present invention and programs for realizing other functions of the navigation apparatus may be stored in a CD-ROM, which serves as an external storage medium. Alternatively, part of these programs may be stored in the ROM (the second ROM 43b) provided in the main body of the navigation apparatus. The data and programs stored in the external memory medium are input as external signals to the information processing/control unit 4 of the main body of the navigation apparatus so as to be processed therein. This makes it possible to realize a variety of kinds of navigation functions.

There are further provided an image memory 44, an image processor 45, a voice processor 46, a communication interface 47, a sensor input interface 48, and a clock 49. The image memory 44 stores image data used for displaying an image on the screen of the display 12. The image processor 45 operates in accordance with display control signals from the CPU 40 so as to read out image data from the image memory 44 and to output the thus-read out data to the display 12 after image processing. The voice processor 46 operates in accordance with voice output control signals from the CPU 40 so as to synthesize a word, a phrase, a complete sentence, a sound, or the like and to covert it to an analog signal to be output to the speaker 14. The communication interface 47 exchanges input/output data with external devices. The sensor input interface 48 inputs sensor signals from the present position detection unit 2. The clock 49 is used for recording data and time as a piece of internal diagnostic information.

In the information processing/control unit 4, when data obtained from the respective sensors of the present position detection unit 2 are input via the sensor input interface 48, the CPU 40 calculates the coordinates of the preset position based on the data at constant time intervals and temporarily stores the coordinates into the RAM 42. The coordinates of the present position are obtained through map matching processing, taking into consideration detection errors of the various kinds of data. The output values from the respective sensors are compensated constantly. In the present embodiment, route guidance is provided through screen display and voice output, and voice output can be selected by the user.

Figure 2:
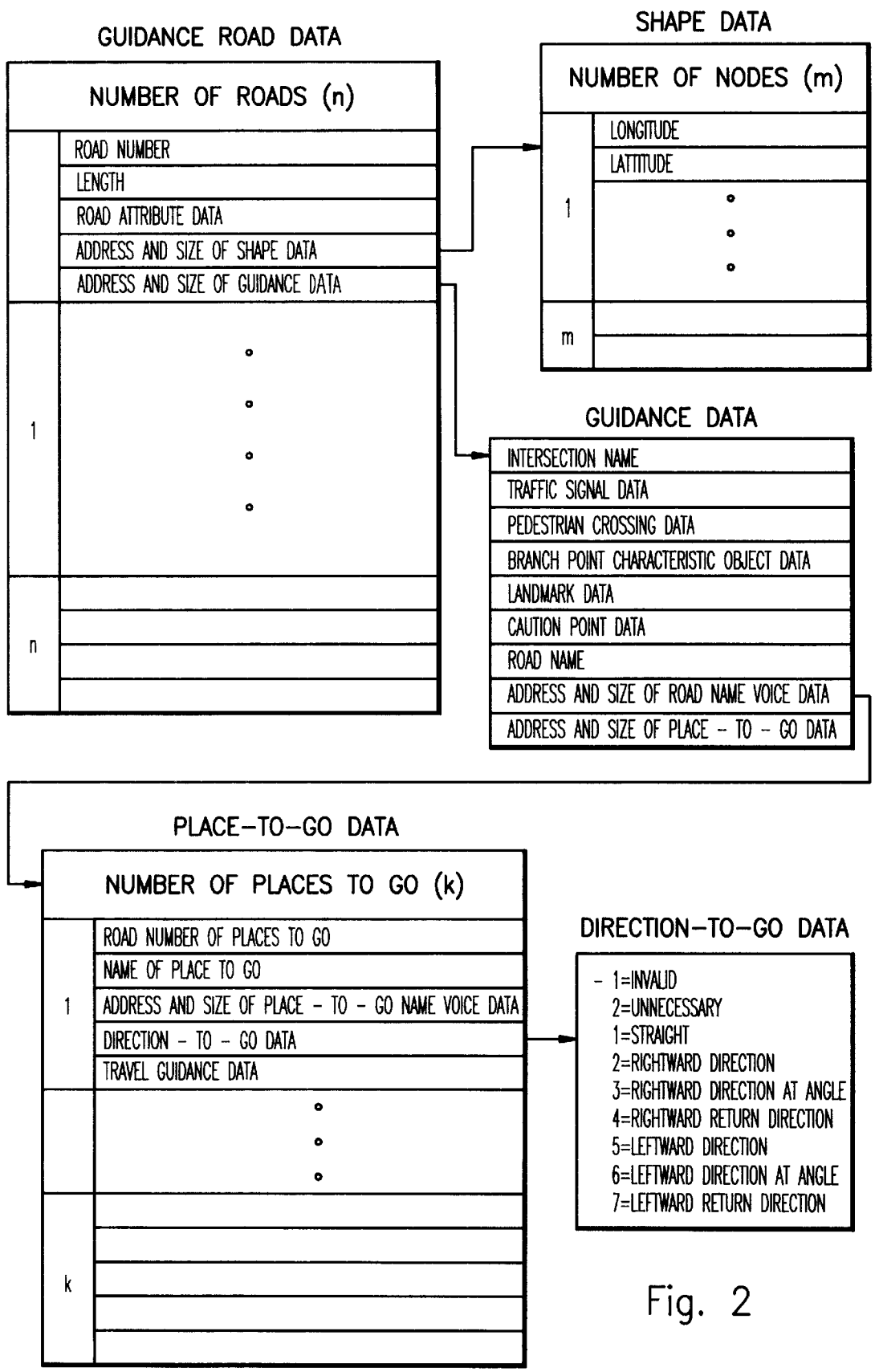
FIG. 2 is a diagram showing the structure of road data used in the navigation apparatus of the present invention.

FIG. 2 shows the contents of a guidance road data file which stores data required for route calculation and route guidance performed by the route calculation means. For each of n roads, there are stored a road number, a length, road attribute data, the address and size of shape data, and the address and size of the guidance data.

For each road section between branch points, different road numbers are set for the outbound direction and the return-direction. The road attribute data includes elevated/underground data representing whether a road is elevated or is adjacent to an elevated road, or whether the road is an underground road or is adjacent to an underground road, as well as data regarding the number of traffic lanes. The shape data includes coordinate data comprising longitude and latitude for each of m nodes with which each road is divided.

The guidance data includes the name of an intersection (or branch point), presence/absence of a traffic signal, presence/absence of a pedestrian crossing, data regarding characteristic objects at the branch point and landmarks (e.g., traffic signs, signs of gas stations, convenience stores, and the like), data regarding a caution point (e.g., a railroad crossing, the entrance and exit of a tunnel, a location where the road width decreases), a road name (information representing the kind of the road (i.e., a highway or an ordinary road (a national road, a prefectural road, or any other road)), the address and size of road name voice data, and the address and size of place-to-go data.

The place-to-go data includes the road number of a road to enter, the name of a place to go, the address and size of voice data for the name of the place to go, the direction-to-go data, and travel guidance data (information designating a course along the center, a rightward offset course, or a leftward offset course).

Figures 3, 4:
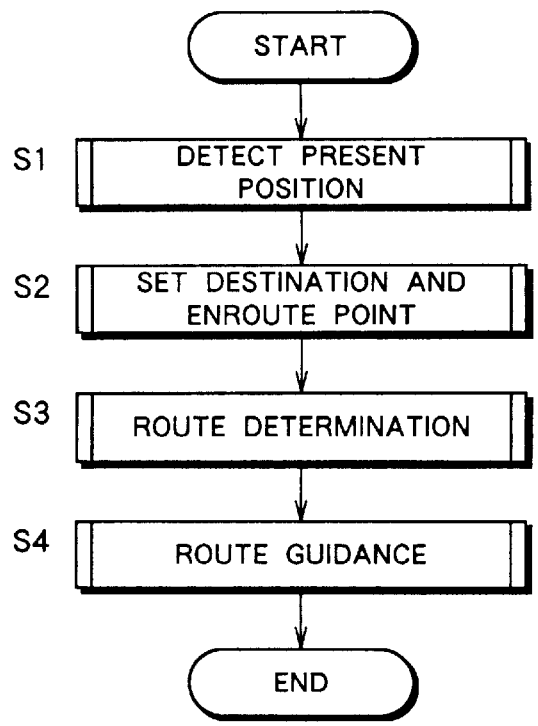
FIG. 3 is a diagram showing intersection data used in the navigation apparatus of the present invention.
FIG. 4 is a flowchart showing a routine for operation of the entire navigation apparatus of the present invention.

The direction-to-go data includes data indicating one of the following information items: information indicating that the data is invalid (i.e., the direction-to-go data is not used): information indicating that the data is unnecessary (i.e., no guidance is provided); and information representing a travel direction selected from a straight direction, a rightward direction, a rightward direction at an angle, a rightward return direction, a leftward direction, a leftward direction at an angle, and a leftward return direction. In the data structure shown in FIG. 2, information regarding intersections is included in the road data. However, as shown in FIG. 3, intersection data may be stored independently of the road data, and there may be stored data regarding presence/absence of a traffic signal and connection information regarding a road or roads that are connected to the intersection. However, when the connection information is included in the road data, it becomes easier to store information regarding road connection such as information representing the impossibility of entry from a certain road to one of other roads connected thereto, so that the amount of data to be stored can be reduced.

FIG. 4 is a flowchart showing the routine for operation of the entire navigation apparatus for a vehicle according to the present invention.

(1) First, the present position (or a start point) required for route determination is detected based on the output from the present position detection means (step S1).

(2) Subsequently, a destination/enroute-point setting screen is displayed so as to cause the user to input a destination and enroute points via an input device to thereby complete setting of the destination and the enroute points (step S2).

(3) Subsequently, the route determination means is operated so as to determine a route from the present position to the destination and/or the enroute points (step S3).

(4) When the user depresses a guidance start key so as to start route guidance, the position of the vehicle is measured by the present position detection means so as to update the stored present position, and at an intersection or a branch point at which the vehicle must turn to the right or left, corresponding route guidance is provided by means of display or voice (step S4).

Next, a detailed description will be given of the route determination subroutines performed in step S3 of FIG. 4.

FIG. 5 shows a flowchart of a first route determination processing according to the present invention, and FIGS. 6A and 6B show an array of road data of a route determined according to the present invention.

(1) First, a routine for setting route determination conditions is carried out (step S11). In this step, the user is allowed to input information as to whether priority is to be given to toll roads as well as his/her preference on the route. Alternatively, the system automatically sets determination conditions.

(2) Subsequently, search road data is read out from the CD-ROM (step S12).

(3) Subsequently, based on the route determination conditions set in step S11, processing for setting search costs is carried out (step S13). In the case where a search cost is stored from the beginning for each of the road data items, that cost is changed directly or a factor by which the cost is multiplied during route calculation is determined. In the case where values representing the length, width, attribute, and the like, of a road is included in the road data and the calculation is conducted based on these values, factors by which the values are multiplied is set.

(4) Subsequently, a route is determined based on the search costs and the factors set in step S13 (step S14).

Next, a detailed description will be given of the cost setting processing carried out in step S13 of FIG. 5. Factors by which the costs of the respective road data are multiplied during route determination are stored in the form of a table. When conditions for route determination are set, factors are selected.

Figures 7, 8:
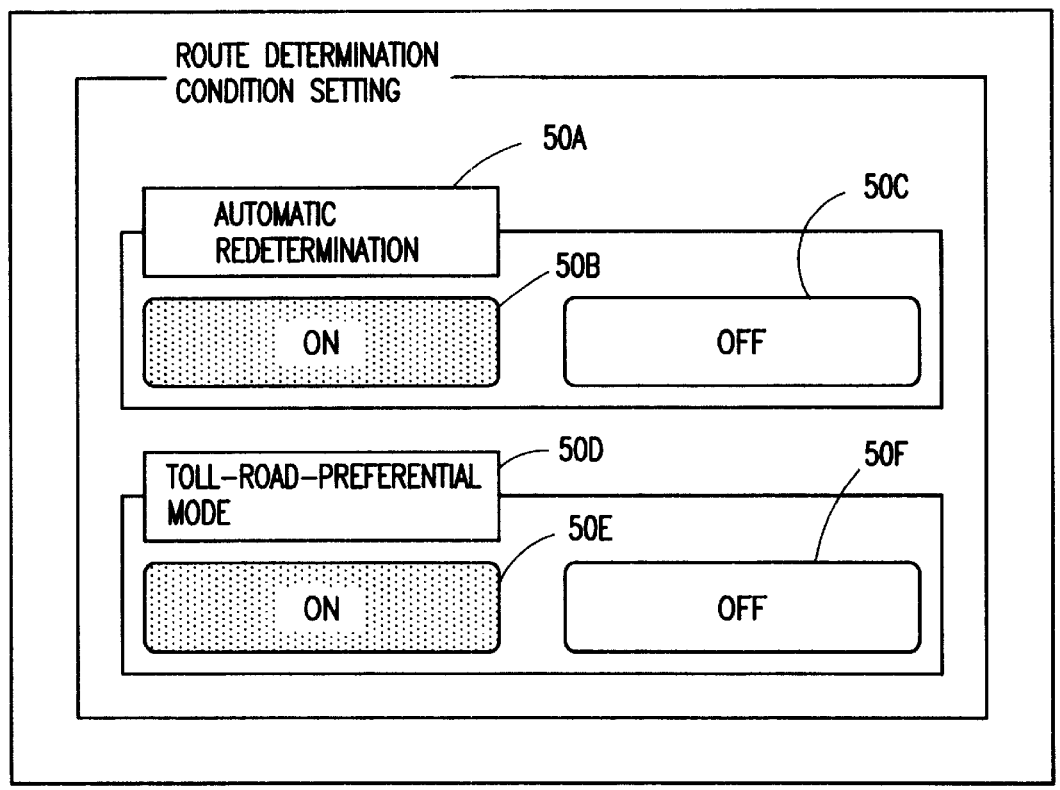
FIG. 7 is table showing modification factors which are given to the costs of data regarding roads and branch points for route determination according to the present invention.
FIG. 8 is a diagram showing a first screen for setting route determination conditions according to the present invention.

As shown in FIG. 7, for each of the conditions (e.g., kind of road, road width, right/left turn, traffic signal, length, and vehicle speed) corresponding to the costs of a road or branch point, there are stored factors for each of three cases (i.e., (1) no determination condition is designated, (2) shortest travel time, and (3) easiness of travel). During route determination, the cost of the road or branch point is multiplied by these factors so as to change the cost. When the shortest travel time is selected as a route determination condition, the factors for the right/left turn and the signal are doubled, so that a route that requires a right or left turn and a route that includes many traffic signals become less likely to be selected.

When easiness of travel is selected as a route determination condition, the factors for the kind of road and the road width are doubled, so that a route that passes through a minor road or a narrow road becomes less likely to be selected. When no determination condition is designated, all the factors are set to 1, so that the cost of the road along which the vehicle is guided and the cost of other roads and branch points stored in the data are maintained unchanged. In the above-described embodiment, the navigation apparatus has a structure such that the user can specify the route determination conditions. However, the structure may be modified such that preferred determination conditions are stored in an IC card. In this case, it becomes possible to determine a route according to the user's preference.

In the case where it is possible to designate whether or not priority is given to toll roads, factors are set for each of the case where priority is given to toll roads and the case where priority is not given to toll roads. When priority has given to toll roads, a route is determined to use a toll road or roads if possible, and when priority has not been given to toll roads, a route is determined to avoid toll roads if possible.

Next, using the above-described navigation apparatus as a premise, a description will be given of embodiments of the present invention regarding a method of automatic switching between the ordinary-road-preferential mode and the toll-road-preferential mode during road redetermination.

FIG. 8 shows a first screen for setting route determination conditions according to the present invention. As shown in FIG. 8, automatic redetermination is designated by an automatic-redetermination ON touch button 50B within an automatic-redetermination setting area 50A and is canceled by an automatic-redetermination OFF touch button 50C within the automatic-redetermination setting area 50A. The toll-road-preferential mode is selected by a toll-road-preference ON touch button 50E within a toll-road-preferential-mode setting area 50D and is canceled by a toll-road-preference OFF touch button 50F within the toll-road-preferential-mode setting area 50D. These touch buttons are provided as a part of the input/output unit 1.

Figure 9:
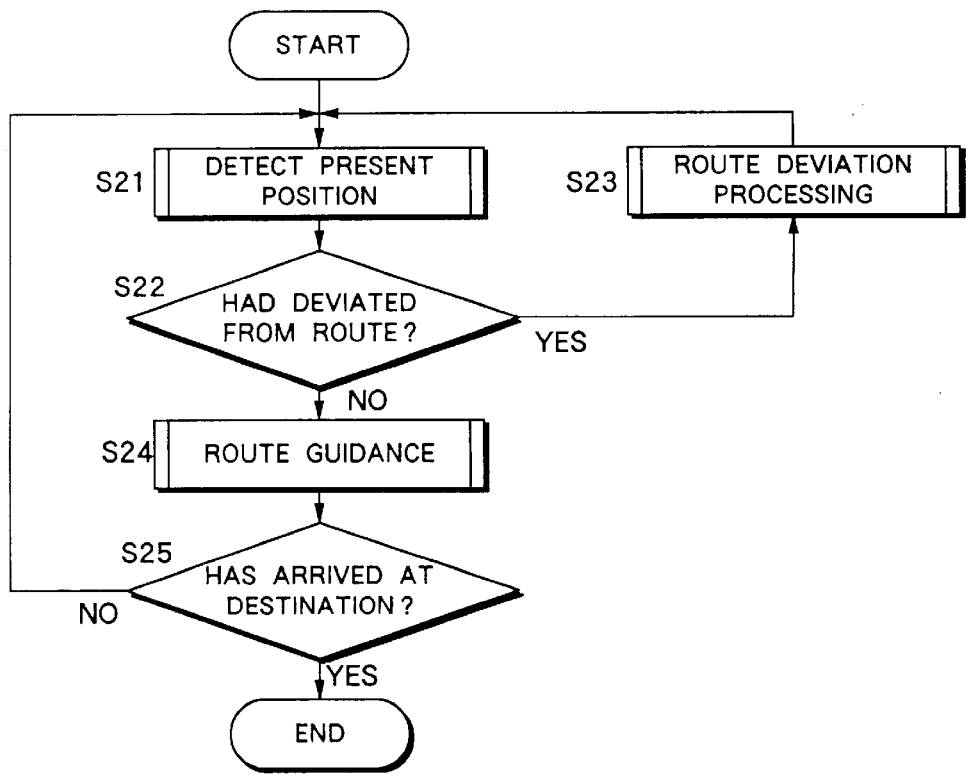
FIGS. 9 and 10 are flowcharts showing route redetermination subroutines which are executed when a vehicle has deviated from a route.

FIG. 9 is a first flowchart showing route redetermination processing which is executed when a vehicle deviates from a route.

(1) First, the present position of the vehicle is detected (step S21).

(2) Subsequently, it is checked whether the vehicle has deviated from the route (step S22).

(3) When it is judged in step S22 that the vehicle has deviated from the route, the subroutines returns to step S21 after carrying out subroutines for route deviation (step S23).

(4) When it is judged in step S22 that the vehicle has not deviated from the route, route guidance is provided (step S24).

(5) Subsequently, the above-described steps S21–S24 are repeated until the vehicle arrives at a destination (step S25).

Next, a detailed description will be given of the processing for route deviation (step S23).

Figure 10:
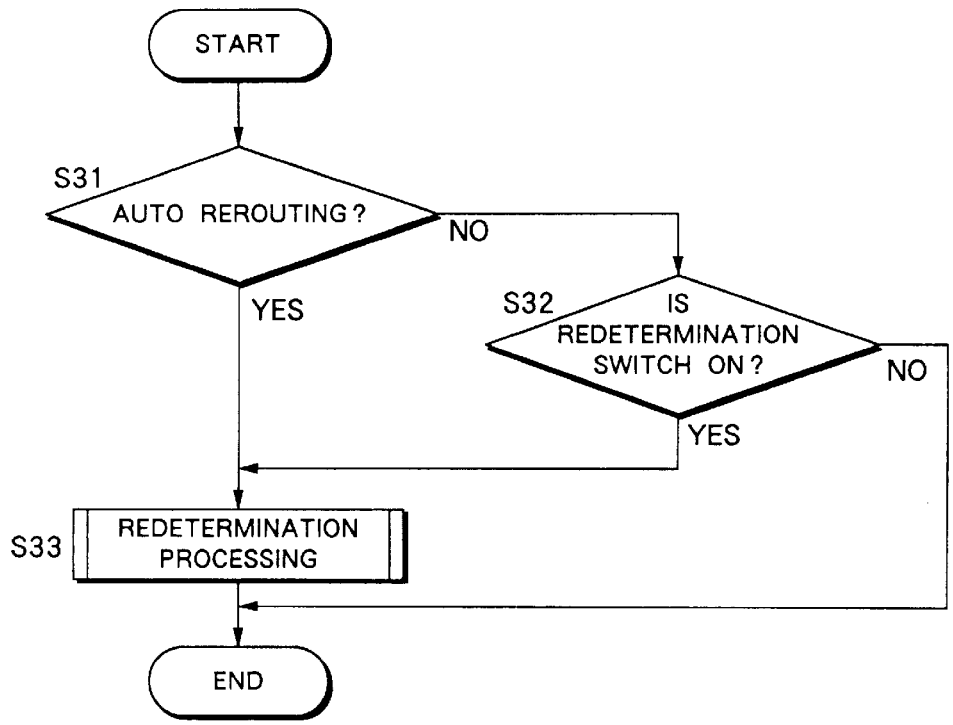

FIG. 10 is a second flowchart showing route deviation processing according to the present invention.

(1) First, it is checked whether there has been designated auto rerouting (a mode in which when it is detected that the vehicle has deviated from a route, a new route from the present position to the destination is automatically determined) (step S31).

(2) Subsequently, when it is judged in step S31 that auto rerouting has not been designated, it is judged whether a route redetermination switch is ON (step S32).

(3) When it is judged in step S31 that auto rerouting has been designated, or when it is judged in step S32 that the route redetermination switch is ON, processing for route redetermination is carried out (step S33).

Next, a detailed description will be given of the processing for route redetermination (step S33).

Figure 11:
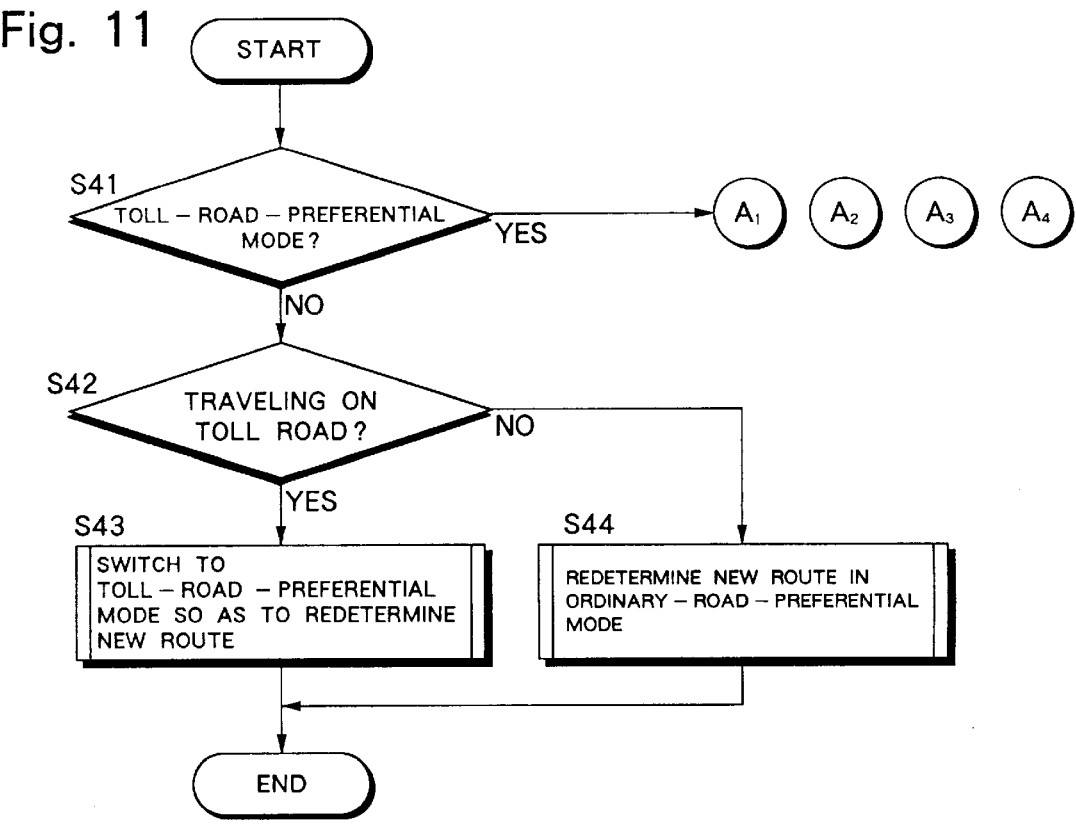
FIGS. 11 and 12 are flowcharts showing route redetermination subroutines according to a first embodiment of the present invention.
Figure 12:
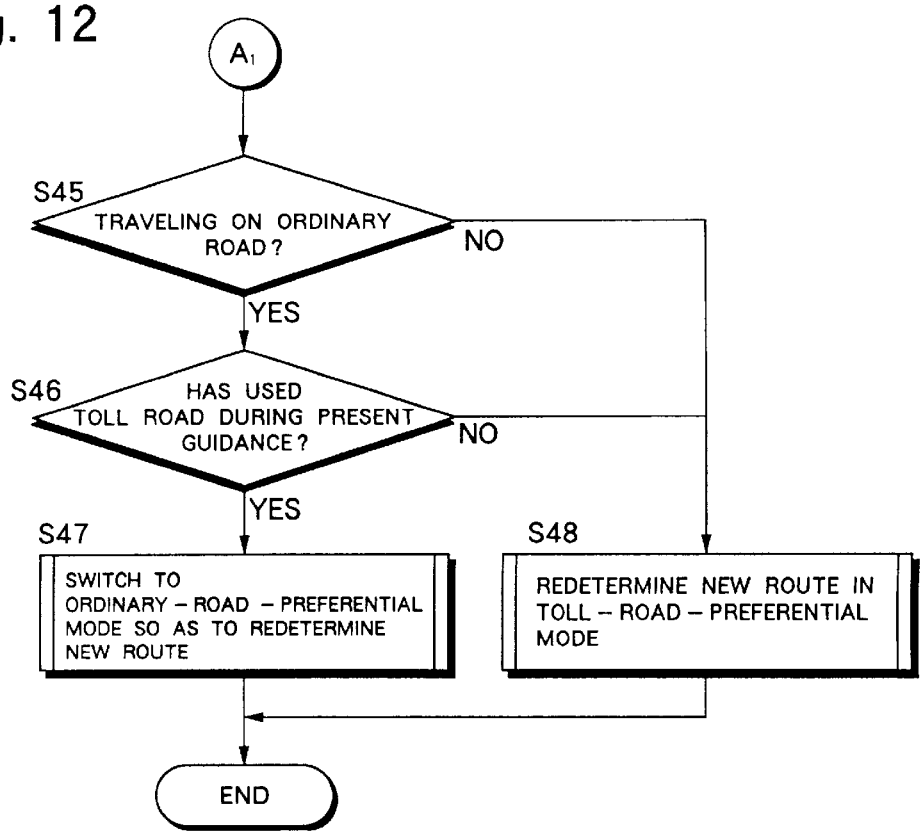

FIGS. 11 and 12 are flowcharts showing route redetermination processing according to a first embodiment of the present invention.

(1) First, it is checked whether the redetermination mode is a toll-road-preferential mode (step S41).

(2) Subsequently, when it is judged in step S41 that the redetermination mode is not the toll-road-preferential mode, it is judged whether the vehicle is traveling on a toll road (step S42).

(3) When it is judged in step S42 that the vehicle is traveling on a toll road, the redetermination mode is changed to the toll-road-preferential mode, and a new route is determined (step S43).

(4) When it is judged in step S42 that the vehicle is not traveling on a toll road, a new route is determined in an ordinary-road-preferential mode (step S44).

(5) When it is judged in step S41 that the redetermination mode is the toll-road-preferential mode, it is checked whether the vehicle is traveling on an ordinary road (step S45).

(6) When it is judged in step S45 that the vehicle is traveling on an ordinary road, it is checked whether a toll road has been used while the present route guidance has been provided (step S46).

(7) When it is judged in step S46 that a toll road has been used, the redetermination mode is switched to the ordinary-road-preferential mode so as to determine a new route (step S47).

(8) When it is judged in step S46 that no toll road has been used, a new route is determined in the toll-road-preferential mode (step S48). This processing is for the case where the initial route is determined in the toll-road-preferential mode, and the vehicle has deviated from the route during travel along an ordinary road before entering a toll road.

Figure 13:
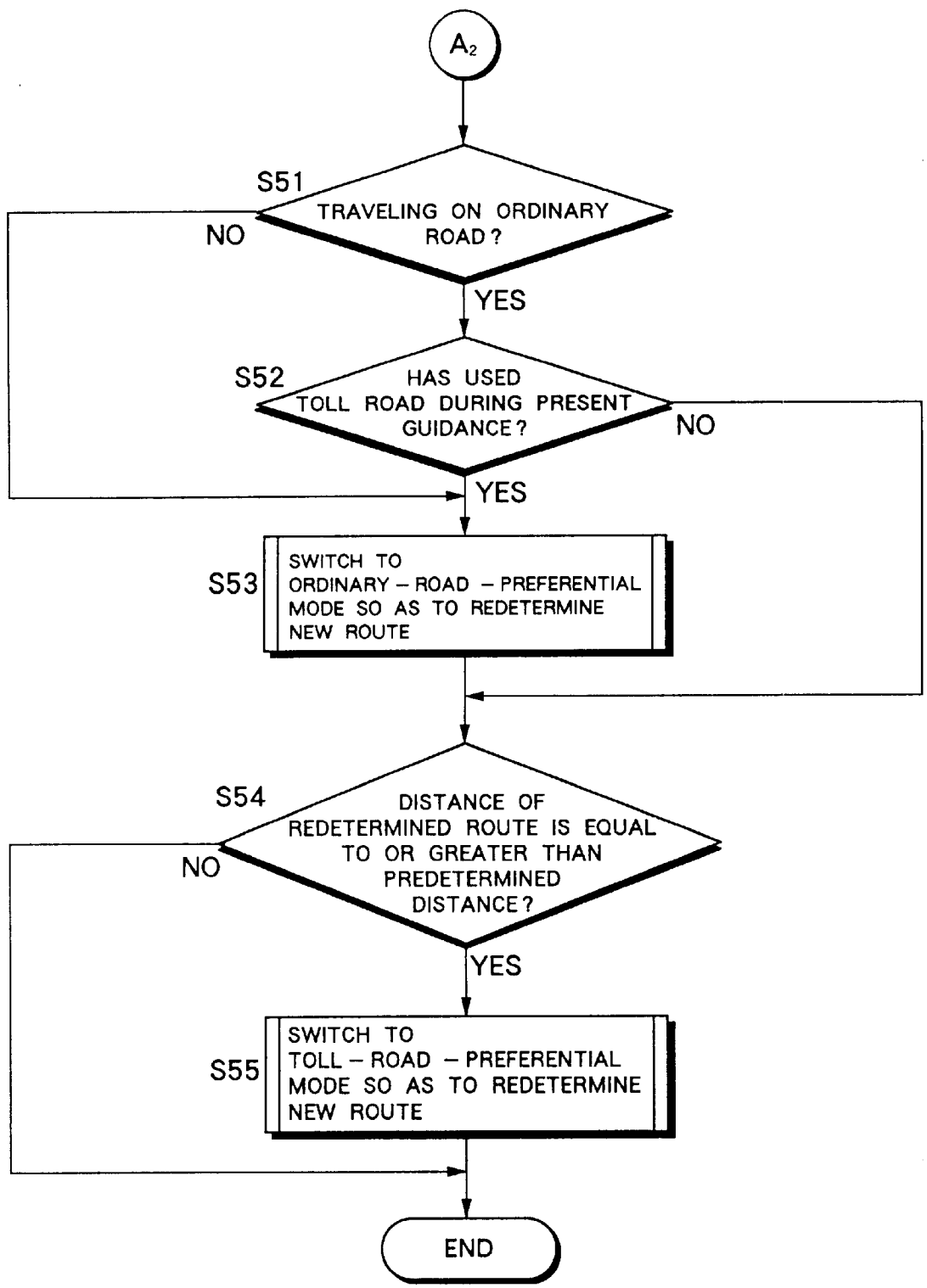
FIG. 13 is a flowchart showing a route redetermination subroutine according to a second embodiment of the present invention.

FIG. 13 is a flowchart showing route redetermination subroutines according to a second embodiment of the present invention.

In addition to the processing shown by the flowchart of FIG. 11, the following subroutines is carried out.

(1) First, it is checked whether the vehicle is traveling on an ordinary road (step S51).

(2) When it is judged in step S51 that the vehicle is traveling on an ordinary road, it is checked whether a toll road has been used while the present route guidance has been provided (step S52).

(3) When it is judged in step S52 that a toll road has been used, the redetermination mode is switched to the ordinary-road-preferential mode so as to determine a new route (step 53). When it is judged in step S52 that no toll road has been used, the processing moves to step S54.

(4) It is checked whether the distance of the new route up to the destination is equal to or greater than a predetermined distance (step S54).

(5) When it is judged in step S54 that the distance of the new route up to the destination is equal to or greater than the predetermined distance, the determination mode is switched to the toll-road-preferential mode so as to determine a new route (step S55).

This processing is for the case where the initial route is determined in the toll-road-preferential mode, and after entering a toll road, the vehicle has left the toll road in order to use an ordinary road. In this processing, a new route is determined in the ordinary-road-preferential mode. However, when the length of the ordinary road is equal to or greater than a predetermined value, the redetermination mode is changed back to the toll-road-preferential mode so as to determine a new route.

In such a case, there is executed processing for selecting one of interchanges located ahead of the vehicle while excluding the interchange behind the vehicle through which the vehicle left the toll road, thereby ensuring that the vehicle does not return to the interchange behind the vehicle.

When the distance between the present position and a located interchange through which the vehicle will enter a toll road is long; i.e., greater than a predetermined distance, or when the distance between the present position and the selected interchange accounts for a large portion of the entire distance of the new route, a route determined in the ordinary-road-preferential mode is used as a new route. This is because the user feels that using a toll road is unnecessary when the selected interchange is too far or when the toll road is short.

Figure 14:
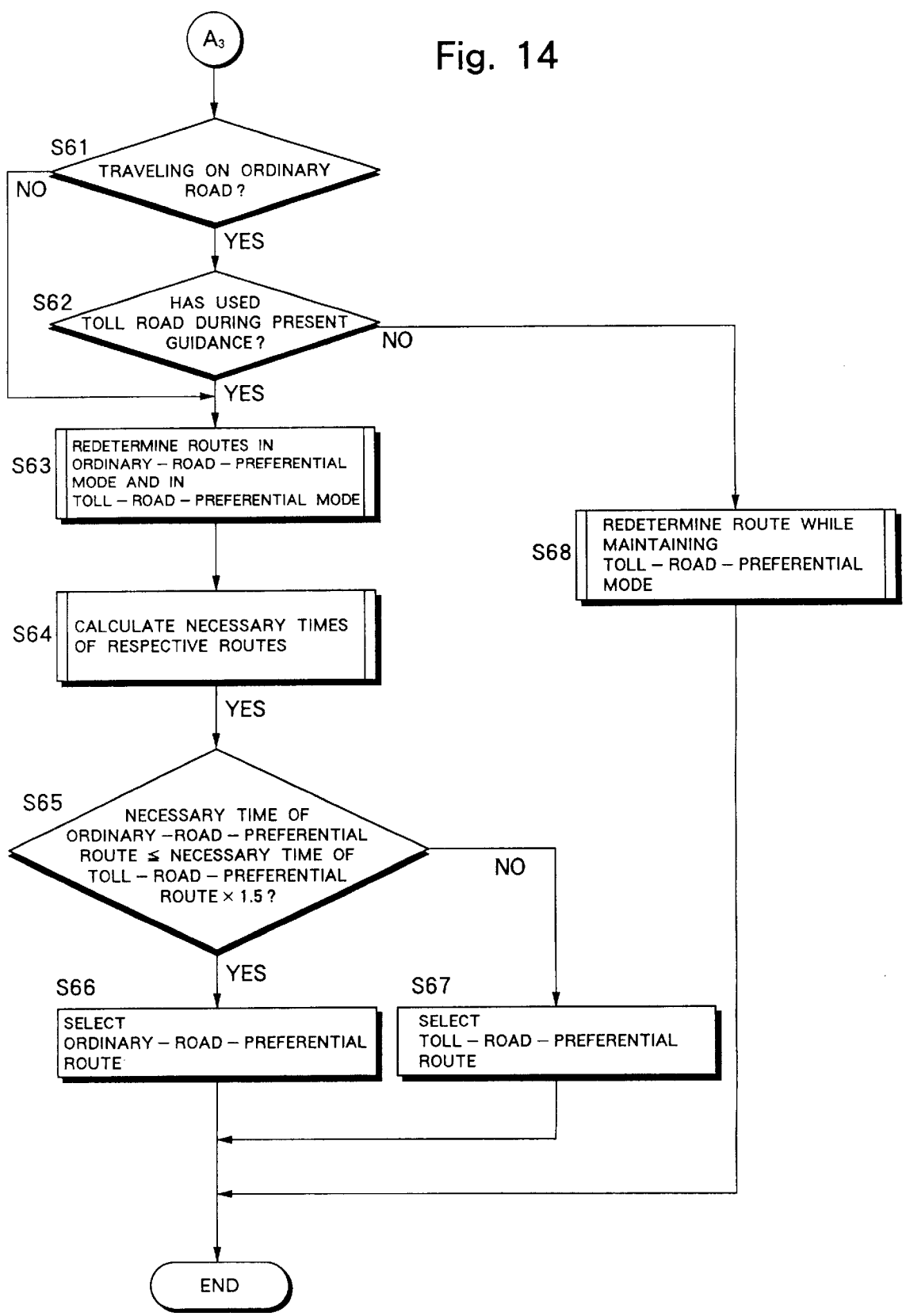
FIG. 14 is a flowchart showing a route redetermination subroutine according to a third embodiment of the present invention.

FIG. 14 is a flowchart showing route redetermination processing according to a third embodiment of the present invention.

In addition to the processing shown by the flowchart of FIG. 11, the following processing is carried out.

(1) First, it is checked whether the vehicle is traveling on an ordinary road (step S61).

(2) When it is judged in step S61 that the vehicle is traveling on an ordinary road, it is checked whether a toll road has been used while the present route guidance has been provided (step S62).

(3) When it is judged in step S62 that a toll road has been used, first and second routes are determined in the ordinary-road-preferential mode and the toll-road-preferential mode, respectively (step S63).

(4) Subsequently, for each of the first and second routes, the time necessary to reach the destination is calculated (step S64). Many methods for calculating such necessary time have been proposed. In one method, an average vehicle speed for each road section is previously included in the road data, and the necessary time of travel is calculated based on such information. Traffic information from VICS and/or ATIS may be taken into consideration.

(5) Subsequently, it is checked whether the following equation is satisfied: necessary time of an ordinary-road-preferential route $\geq$ necessary time of a toll-road-preferential route$\times$1.5 (step 65). In the present embodiment, the coefficient is set to 1.5. However, the coefficient is not limited to 1.5, and the coefficient may be set in advance in accordance with, for example, the time at which the user desires to arrive at the destination, while 1.5 is used as a standard.

(6) When it is judged in step S65 that the above equation is satisfied, the ordinary-road-preferential route is selected (step S66).

(7) When it is judged in step S65 that the above equation is not satisfied, the toll-road-preferential route is selected (step S67).

(8) When it is judged in step S62 that no toll road has been used, a new route is determined while the toll-road-preferential mode is maintained (step S68).

This processing is for the case where the initial route is determined in the toll-road-preferential mode, and after entering a toll road, the vehicle has left the toll road in order to use an ordinary road. In this processing, one of a route determined in the ordinary-road-preferential mode and a route determined in the toll-road-preferential mode is automatically selected.

In the present embodiment, a description is given of route redetermination during travel along the initially determined route. However, the above-described method may be employed for automatically selecting one of the ordinary-road-preferential mode and the toll-road-preferential mode for initial route determination.

Figure 15:
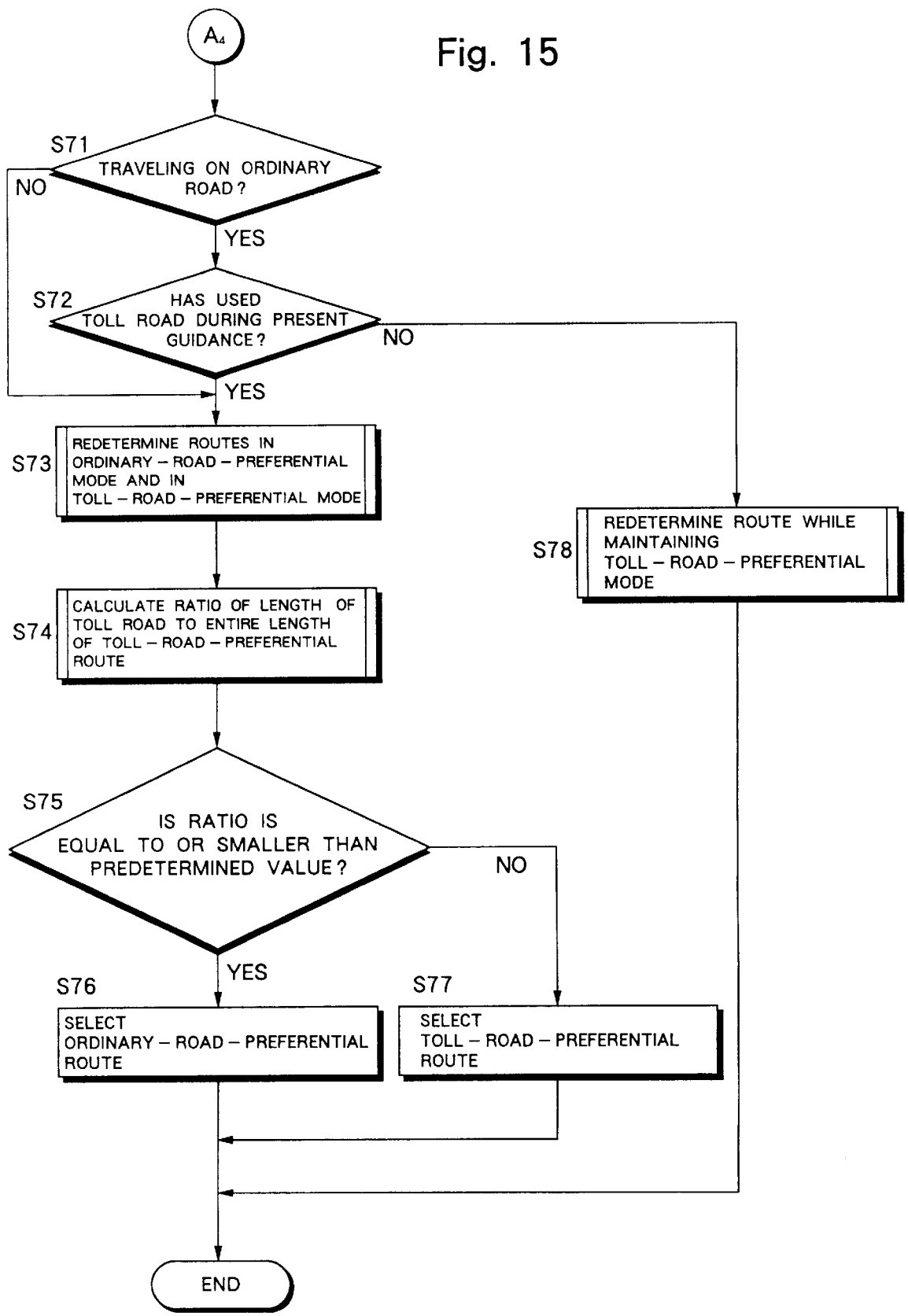
FIG. 15 is a flowchart showing a route redetermination subroutine according to a fourth embodiment of the present invention.

FIG. 15 is a flowchart showing route redetermination processing according to a fourth embodiment of the present invention.

In addition to the processing shown by the flowchart of FIG. 11, the following processing is carried out.

(1) First, it is checked whether the vehicle is traveling on an ordinary road (step S71).

(2) When it is judged in step S71 that the vehicle is traveling on an ordinary road, it is checked whether a toll road has been used while the present route guidance has been provided (step S72). When it is judged in step S71 that the vehicle is not traveling on an ordinary road, the processing moves to step S73.

(3) When it is judged in step S72 that a toll road has been used, first and second routes are determined in the ordinary-road-preferential mode and the toll-road-preferential mode, respectively (step S73).

(4) Subsequently, there is calculated the ratio of the length of a toll road to the entire length of the route determined in the toll-road-preferential mode (step S74).

(5) It is checked whether the ratio is equal to or less than a predetermined value (step S75).

(6) When it is judged in step S75 that the ratio is equal to or less than the predetermined value, the route determined in the ordinary-road-preferential mode is selected (step S76).

(7) When it is judged in step S75 that the ratio is greater than the predetermined value, the route determined in the toll-road-preferential mode is selected (step S77).

(8) When it is judged in step S72 that no toll road has been used, a new route is determined while the toll-road-preferential mode is maintained (step S78).

This processing is for the case where the initial route is determined in the toll-road-preferential mode, and after entering a toll road, the vehicle has left the toll road in order to use an ordinary road. In this processing, the ratio of the length of a toll road to the entire length of the route determined in the toll-road-preferential mode is calculated in order to make judgment as to whether the route determined in the toll-road-preferential mode is regarded as valid. When the distance over which a toll road is used accounts for only small portion of the entire length of a route, the necessary travel time becomes almost same as that in the case where an ordinary road is used. Therefore, a route is determined in a state in which priority is given to the ordinary roads.

In the present embodiment, a description is given of route redetermination during travel along the initially determined route. However, the above-described method may be employed for automatically selecting one of the ordinary-road-preferential mode and the toll-road-preferential mode for initial route determination.

The above-described structure makes it possible to properly determine a route from a start point to a destination, taking into consideration the ratio of the length of a toll road or roads to the entire length.

Moreover, the above-described structure may be modified so as to allow the user to select one of the ordinary-road-preference determination and the toll-road-preference determination in accordance with road conditions as follows.

(1) In the case where there is used a system in which information regarding a traffic jam is received and displayed on a map, the initial route is determined in the toll-road-preferential mode, the vehicle has left a toll road in order to use an ordinary road, and it is judged that there is received traffic information reporting, for example, a traffic jam ahead of the interchange through which the vehicle has left the toll road, the redetermination mode is switched to the ordinary-road-preferential mode so as to determine a new route.

(2) In a system which allows a user to input enroute points, selection between the toll-road-preferential mode and the ordinary-road-preferential mode can made for each road section.

In this case, the processing for performing switching between the ordinary-road-preferential mode and the toll-road-preferential mode is executed for each road section independently of processing for other road sections.

In the present embodiment, a description is given of route redetermination during travel along the initially determined route. However, the above-described method may be employed for automatically selecting one of the ordinary-road-preferential mode and the toll-road-preferential mode for initial route determination.

Next, a description will be given of another embodiment of the present invention.

In the present embodiment, the navigation apparatus for a vehicle shown in FIG. 1, the structure of road data shown in FIG. 2, the intersection data shown in FIG. 3, the control of the overall navigation apparatus shown in FIG. 4, the route data shown in FIG. 6, and the modification factors shown in FIG. 7 that are given to the costs of roads and branch points for route determination are also used.

As shown in FIG. 1, the information storage unit 3 of the navigation apparatus of the present embodiment stores a program for setting a destination and enroute points based on positional information from the present position detection unit 2 and input signals from the input/output unit 1 and for conducting route determination through use of search road data; a program for converting the search road data so as to carry out route redetermination when the vehicle deviates from a route; and a program for depicting maps, for carrying out map matching, and for determining the timing of voice output along the route as well as the contents of phrases for voice output. Moreover, the information storage unit 3 stores a program for setting search ranges that extend from a start point and a destination, respectively, within predetermined angular ranges determined with a line connecting the start point and the destination used as a reference and for searching interchanges of a special road located within the search ranges; a program for setting search areas included within the search ranges and for searching interchanges of a special road located within the areas; and a program for determining a route in which the located interchanges are used. The various functions of the navigation apparatus according to the present embodiment of the present invention are realized through execution of these programs stored in the information storage unit 3. In other words, in the present embodiment, the programs which realize the functions of the present invention are stored in the information storage unit 3, which is an external storage medium.

Next, a detailed description will be given of the route determination processing in step S3 of FIG. 4.

Figure 16:
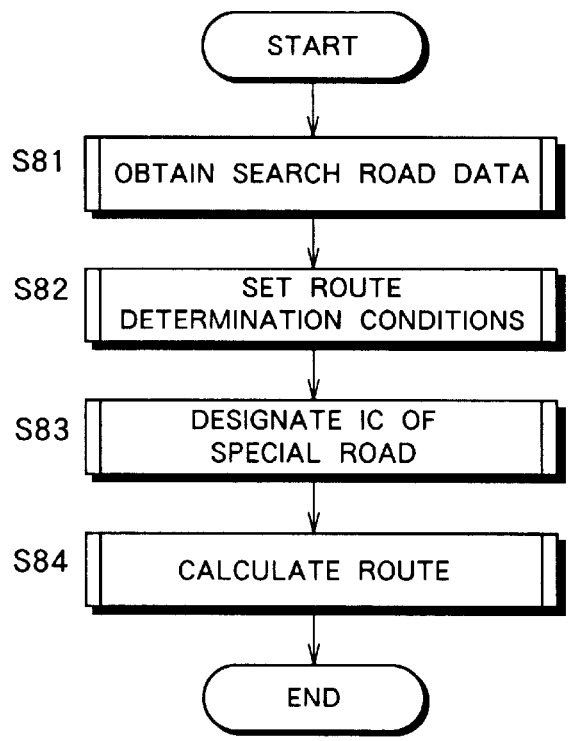
FIG. 16 is a flowchart showing a second route determination subroutine according to the present invention.

FIG. 16 is a flowchart showing a second route determination processing according to the present invention.

(1) First, search road data having the structure as shown in FIG. 2 is read out from a CD-ROM (step S81).

(2) Subsequently, a routine for setting route determination conditions is carried out (step S82). In this step, the user is allowed to input information as to whether priority is to be given to special roads as well as his/her preference for the route. Alternatively, the system automatically sets determination conditions.

(3) Subsequently, a routine for designating interchanges of a special road is carried out (step S83).

(4) Subsequently, there is calculated a route in which the interchanges of the special road designated in step S83 are used (step S84).

Next, a detailed description will be given of the processing for setting route determination conditions in step S82 of FIG. 16.

Figure 17:
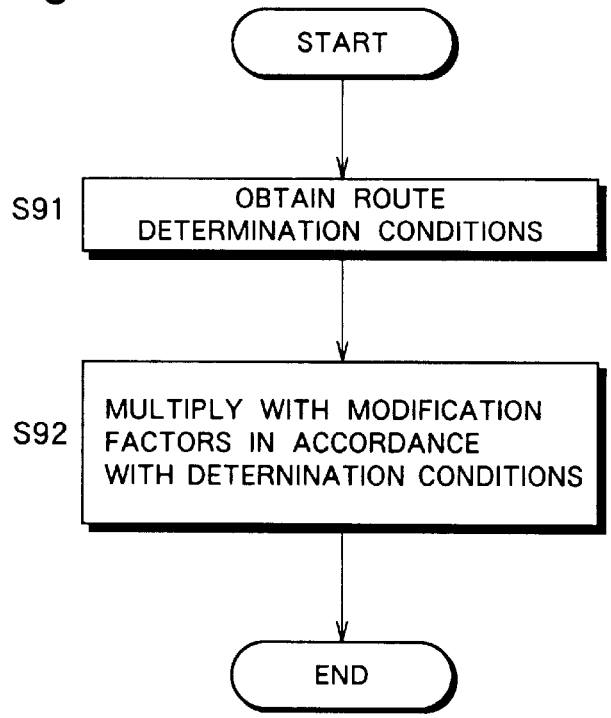
FIG. 17 is a flowchart of a subroutine for setting route determination conditions according to another embodiment of the present invention.

FIG. 17 is a flowchart showing the processing for setting a route determination condition.

(1) First, route determination conditions such as shortest travel time and easiness of travel are selected and obtained (step S91).

(2) Subsequently, the costs of roads and branch points are multiplied by modification factors determined according to the selected route determination conditions (step S92).

Since the modification factors are the same as those used in the previously described embodiments, a description therefor will be omitted.

Next, a detailed description will be given of the subroutines in step S83 of FIG. 16 according to the present embodiment which designates interchanges of a special road when determination as to whether priority is given to a special road is performed automatically.

Figure 22:
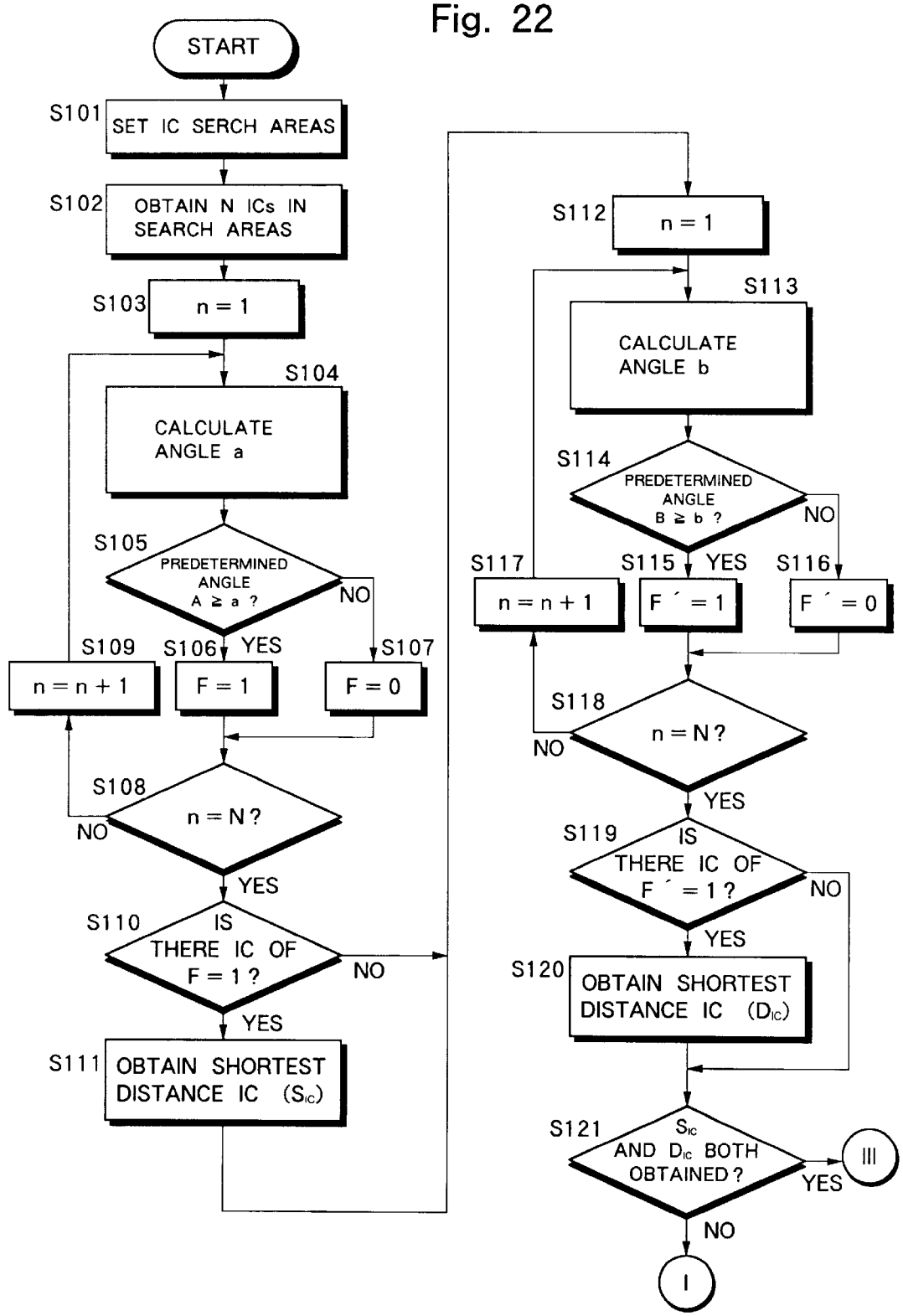
FIG. 22 is a flowchart showing the processing for automatically determining whether priority is given to a special road according to the embodiment of the present invention.

FIG. 22 is a flowchart of a subroutine for automatically determining whether priority is given to a special road according to the present embodiment of the present invention.

(1) First, interchange (IC) search areas are set in order to search interchanges through which the vehicle enters a special road after leaving the present position (start point) and exits the special road before reaching a destination (an enroute point) (step S101). Exemplary methods of setting such IC search areas are shown in FIGS. 18 and 19.

Figure 18:
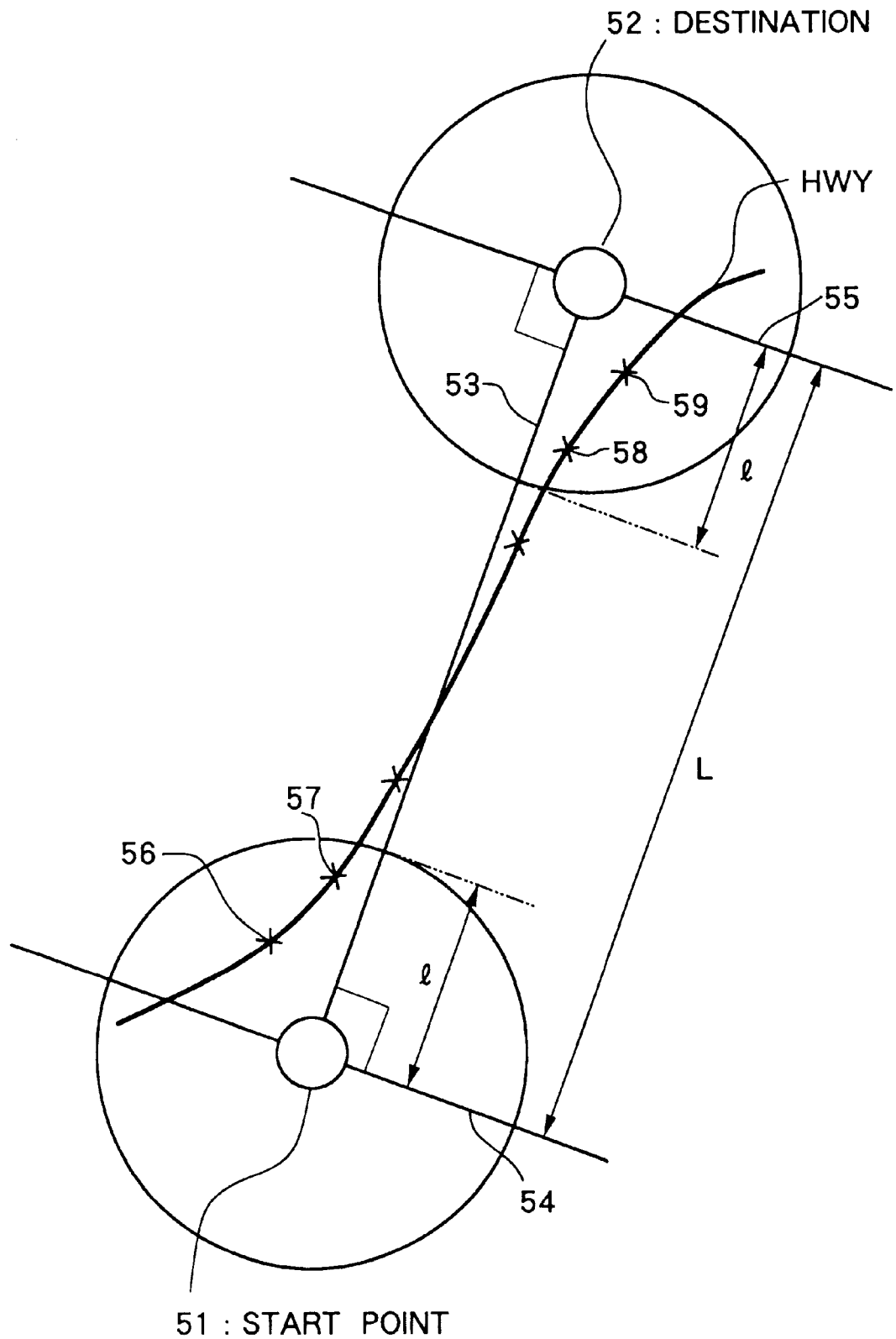
FIG. 18 is an explanatory diagram showing a first method for setting search areas according to the embodiment of the present invention.

In the method shown in FIG. 18, semicircular areas are first defined. The semicircular areas each have a predetermined radius l, are centered at a start point 51 and a destination 52, respectively, and have reference lines 54 and 55 that are perpendicular to a line 53 (distance: L) connecting the start point 51 and the destination 52 and that pass through the start point 51 and the destination 52, respectively. Interchanges 56 and 57 included in one of the semicircular areas are regarded as candidates for an IC that is used to enter a special road HWY after leaving the start point (hereinafter referred to as an $S_{IC}$), whereas interchanges 58 and 59 included in the other semicircular area are regarded as candidates for an IC that is used to exit the special road HWY (hereinafter referred to as a $D_{IC}$).

Figure 19:
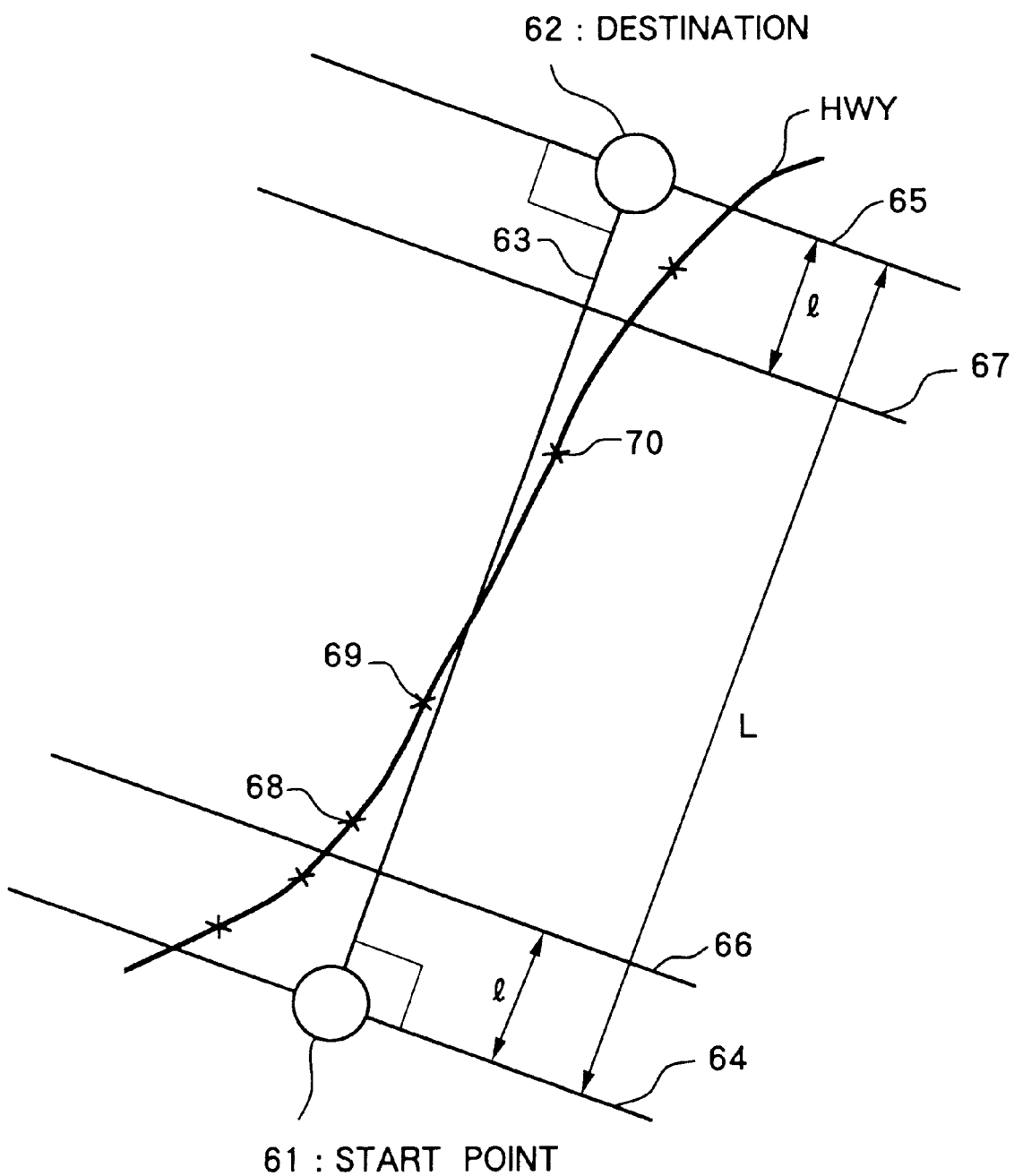
FIG. 19 is an explanatory diagram showing a second method for setting search areas according to the embodiment of the present invention.

In the method shown in FIG. 19, an area sandwiched between two parallel lines is first defined. The area is sandwiched by lines 66 and 67 which are parallel to lines 64 and 65 respectively intersecting a start point 61 and a destination 62 at right angles with respect to a line 63 (distance: L) connecting the start point 61 and the destination 62. Lines 66 and 67 are respectively separated from the start point 61 and the destination 62 by a predetermined amount l ($0 \leq l \leq L/2$). ICs 68, 69, and 70 are regarded as candidates for $S_{IC}$ and $D_{IC}$. HWY represents a special road.

(2) Subsequently, the coordinates of N ICs included in the IC search area or areas set in step S101 are obtained (step S102).

(3) Subsequently, one of the N ICs obtained in step S102 is selected (step S103).

Figure 20:
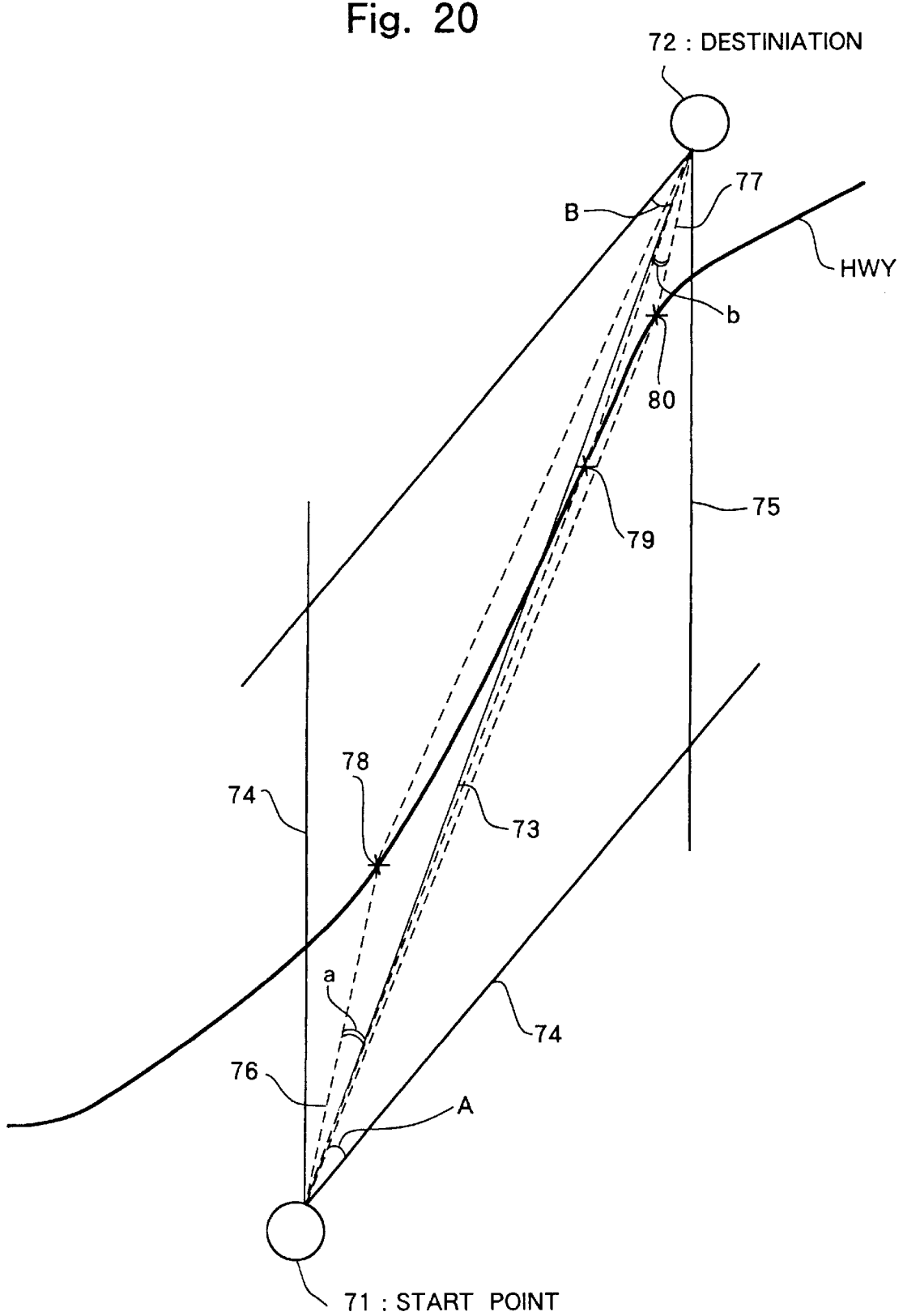
FIG. 20 is an explanatory diagram showing a first method for selecting interchanges of a special road according to the embodiment of the present invention.

(4) Subsequently, the angle a between a line connecting the start point and the destination and a line connecting the start point and the selected IC is calculated (step S104). Specifically, as shown in FIG. 20, there is calculated the angle a between the line 73 connecting the start point 71 and the destination 72 and the line 76 connecting the start point 71 and the IC 78.

(5) Subsequently, it is judged whether the angle a is equal to or less than a predetermined angle A (e.g., 30 degrees) (step S105). In FIG. 20, numeral 74 denotes lines that extend from the start point 71 at the predetermined angle A with respect the line 73.

When it is judged that the angle a is equal to or less than the predetermined angle A, the processing moves to step S106 so as to set flag F to 1, and then moves to step S108. When it is judged that the angle a is greater than the predetermined angle A, the processing moves to step S107 so as to set flag F to 0, and then moves to step S108.

(6) In step S108, it is judged whether judgment has been made for all the N ICs.

(7) When it is judged in step S108 that judgment has not been made for all the N ICs, the operations from step S104 to step S109 are repeated until n reaches N or until judgment has been made for all the N ICs. When it is judged in step S108 that n has reached N, the subroutines moves to step 110.

(8) In step S110, it is judged whether there exists an IC with which the flag F becomes 1. When it is judged that there does not exist an IC with which the flag F becomes 1, the processing moves to step S112. When it is judged that there exists an IC or ICs with which the flag F becomes 1, the processing moves to step S111 so as to select one of the ICs with which the flag F is set to 1, such that the distance between the start point and the selected IC becomes shortest or the time required to reach the selected IC becomes shortest. In this way, the IC ($S_{IC}$) for entering the special road after leaving the start point is determined.

Subsequently, processing for determining an IC ($D_{IC}$) for leaving the special road is carried out. The processing of steps S112–S118 is the same as that of steps S103–S108, except that the destination substitutes for the start point.

(9) One of the N ICs is selected (step S112).

(10) Subsequently, the angle b between the line connecting the start point and the destination and a line connecting the destination and the selected IC is calculated (step S113). Specifically, as shown in FIG. 20, the angle b between the line 73 connecting the start point 71 and the destination 72 and the line 77 connecting the destination 72 and the IC 80 is calculated.

(11) Subsequently, it is judged whether the angle b is equal to or less than a predetermined angle B (e.g., 30 degrees) (step S114). In FIG. 20, numeral 75 denotes a line that extends from the destination 72 at the predetermined angle B.

When it is judged that the angle b is equal to or less than the predetermined angle B, the processing moves to step S115 so as to set flag F' to 1, and then moves to step S118. When it is judged that the angle b is greater than the predetermined angle B, the processing moves to step S116 so as to set flag F' to 0, and then moves to step S118.

(12) In step S118, it is judged whether judgment has been made for all the N ICs.

(13) When it is judged in step S118 that judgment has not been made for all the N ICs, the operations from step S113 to step S117 is repeated until n reaches N or until judgment has been made for all the N ICs. When it is judged in step S118 that n has reached N, the processing moves to step S119.

(14) In step S119, it is judged whether there exists an IC with which the flag F' becomes 1. When it is judged that there does not exist an IC with which the flag F' becomes 1, the processing moves to step S121. When it is judged that there exists an IC or ICs with which the flag F' becomes 1 exists, the processing moves to step S120 so as to select one of the ICs with which the flag F' are set to 1, such that the distance between the destination and the selected IC becomes shortest or the time required to reach the destination from the selected IC becomes shortest. In this way, the IC ($D_{IC}$) for exiting the special road so as to reach the destination is selected.

(15) In step S121, it is judged whether $S_{IC}$ and $D_{IC}$ have both been obtained. When it is judged that both have been obtained, the processing moves to step S84 (FIG. 16) so as to calculate a route in the mode in which priority is given to special roads. When it is judged that one or both have not been obtained, processing for enlarging the search areas is performed (see FIG. 23). In FIG. 20, HWY indicates a special road.

Next, a description will be given of the processing for enlarging the search area.

Figure 23:
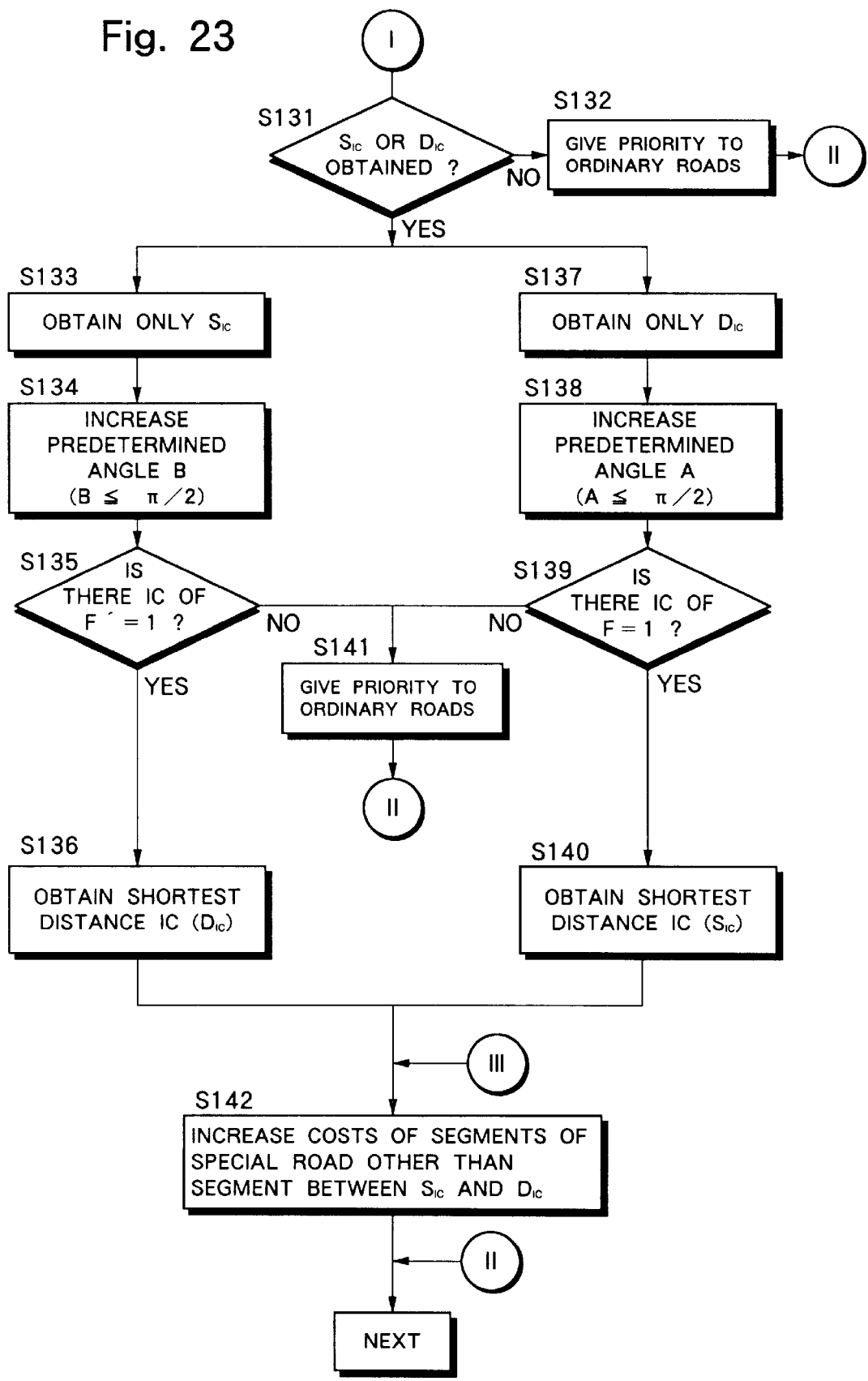
FIG. 23 is a flowchart of a subroutine for enlarging a search area according to the embodiment of the present invention.

FIG. 23 is a flowchart of a processing for enlarging a search area according to the embodiment of the present invention.

In step S131, it is judged whether either of $S_{IC}$ and $D_{IC}$ has been obtained. When it is judged that none of $S_{IC}$ and $D_{IC}$ has been obtained, the subroutines moves to step S132 so as to calculate a route in the mode in which priority is given to ordinary roads. When only $S_{IC}$ is obtained, the processing moves to step S134 via step S133. In step S134, the predetermined angle B for the destination side is increased, and it is judged whether there exists an IC with which the flag F' becomes 1 (step S135). When it is judged in step S135 that there exists an IC with which the flag F' becomes 1, an IC that minimizes the distance between that IC and the destination is selected as $D_{IC}$ (step S136).

When only $D_{IC}$ is obtained in step S131, processing similar to the above-described processing is performed in steps S137–S140, so that $S_{IC}$ is obtained. When an IC with which F' becomes 1 cannot be obtained in step S135 or when an IC with which F becomes 1 cannot be obtained in step S139; i.e., when neither $S_{IC}$ nor $D_{IC}$ is obtained, the processing moves to step S141 so as to calculate a route in the mode in which priority is given to ordinary roads. When $S_{IC}$ and $D_{IC}$ are both obtained, the processing moves to step S142 in order to multiply the costs of road segments of the special road, other than the road segment between $S_{IC}$ and $D_{IC}$, by a modification factor, so that the costs of the road segments other than the road segment between $S_{IC}$ and $D_{IC}$ increase. This correction decreases the possibility of selecting the road segments of the special road, other than the road segment between $S_{IC}$ and $D_{IC}$.

Next, the processing moves to step S84 in FIG. 16 so as to calculate a route.

During the route calculation or determination, route data as shown in FIG. 6 (see FIGS. 24 and 25 as well) is prepared, and a route is determined in a state in which priority is given to a special road.

An example of route calculation will now be described in detail.

A labeling method is used in order to calculate an optimal route. In the labeling method, branches are extended from a start point to all downstream adjacent points, from which branches are further extended to downstream points. When a plurality of branches merge at the same point, one of the branches which minimizes the cost (distance, time, etc.) required to reach that point is employed.

In a road network, there can be designated as a destination either of the opposite lanes of a road section between two adjacent intersections.

Figure 24:
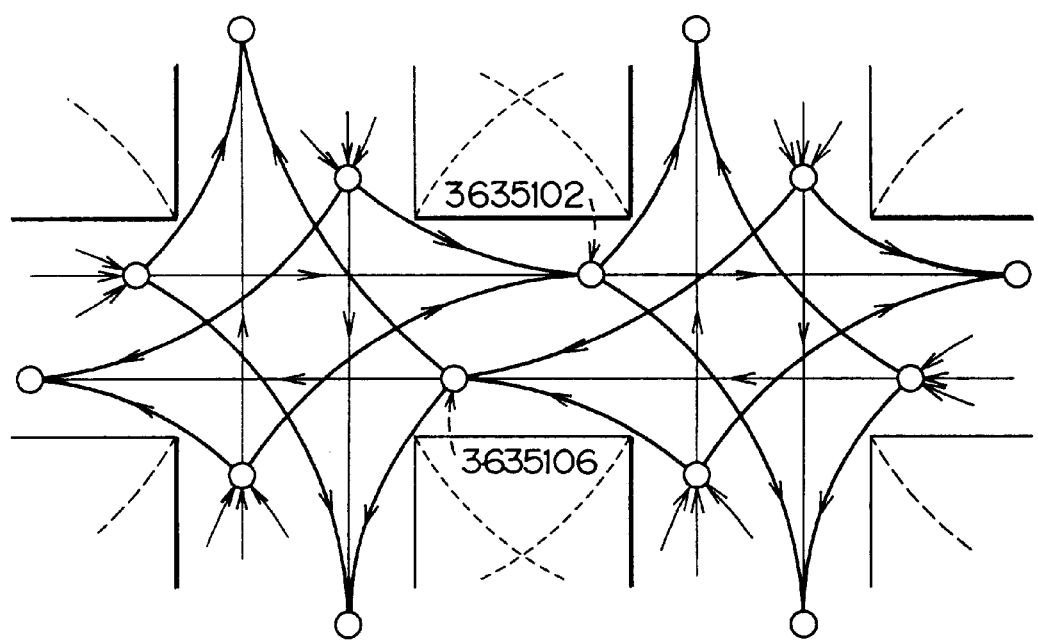
FIG. 24 shows an example of a road network in the road determination according to the embodiment of the present invention.

Such a point is called a "road point," and a link connecting adjacent two road points is called an "arc" (see FIG. 24).

Communication antennas are disposed at these road points. A seven-digit number is assigned to each road point as a destination code.

Such a road network is affected by traffic regulations. When different regulations are placed on various vehicle types, an optimum route must be calculated for each vehicle type. However, there has been employed a measure in which an improved calculation algorithm is used to obtain commonly optimum routes for various vehicle types to the greatest possible extent.

Figure 25:
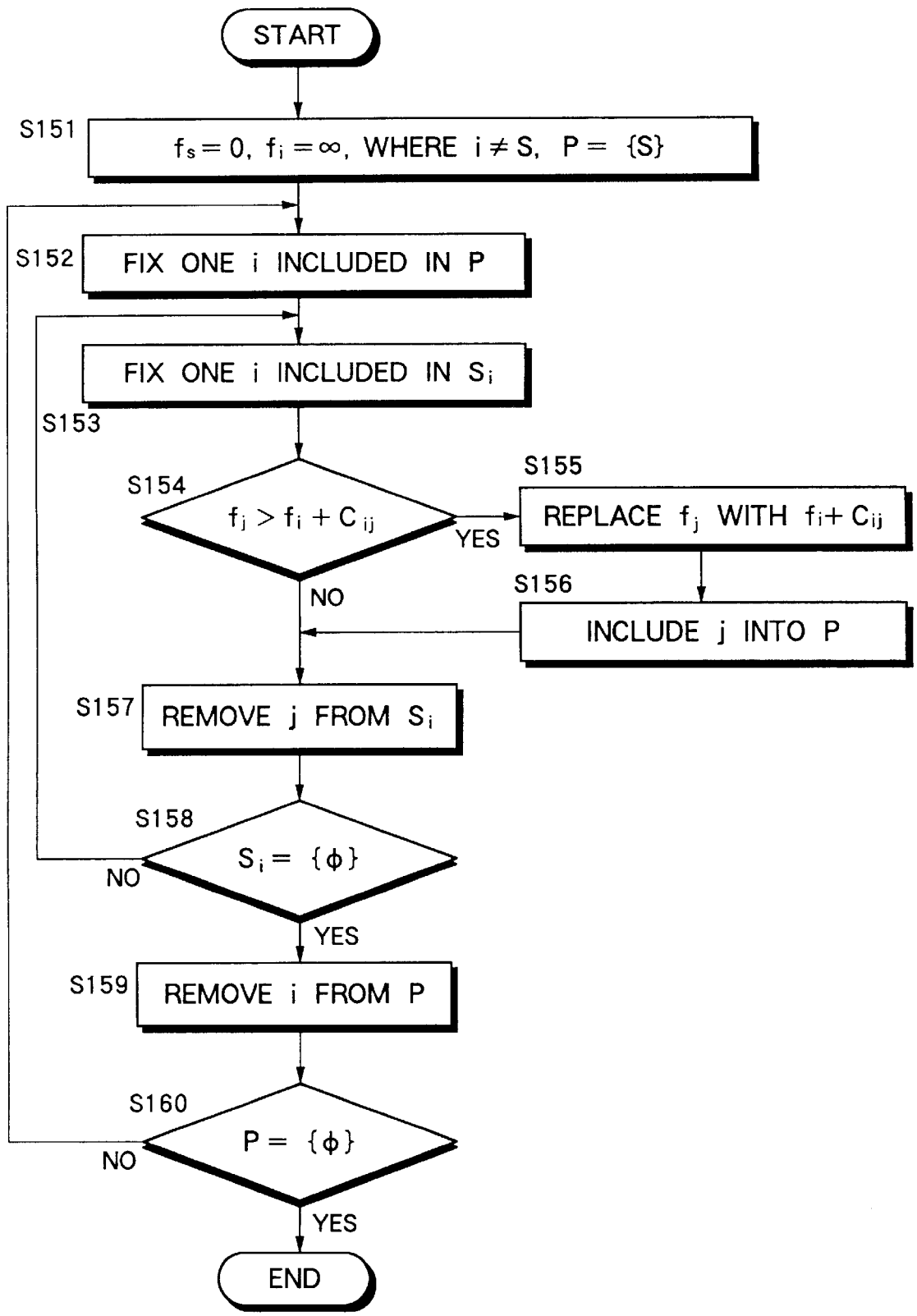
FIG. 25 is an explanatory diagram showing a labeling method used in the route calculation according to the embodiment of the present invention.

FIG. 25 is a flowchart showing the labeling method.

In the flowchart, S in the form of a capital letter or in the form of a subscript represents a start node, i and j in the form of small letters or in the form of subscripts represent nodes, $S_i$ is a set of nodes subsequent to the node i, $f_i$ is the sum of arc costs along a route from node S to node i, $C_{ij}$ is an arc cost from node i to node j, P is a set of pivot nodes, and $\{\phi\}$ is the empty set.

(1) First, initialization is performed such that $f_s=0$, $f_i=\infty$, where i≠S, P={S } (step S151).

(2) Subsequently, one i included in P is fixed (step S152).

(3) Subsequently, one i included in $S_i$ is fixed (step S153).

(4) Subsequently, it is judged whether $f_j>f_i+C_{ij}$ (step S154).

(5) When it is judged in step 154 that $f_j>f_i+C_{ij}$, $f_j$ is replaced with $f_i+C_{ij}$, (step S155).

(6) Subsequently, j is included in P (step S156), and the processing moves to step S157.

(7) When it is judged in step S154 that the relationship $f_j>f_i+C_{ij}$ is not satisfied, j is removed from $S_i$ (step S157).

(8) Subsequently, it is judged whether $S_i=\{\phi\}$ (step S158). When it is judged in step S158 that the equation $S_i=\{\phi\}$ is not satisfied, the processing returns to step S153.

(9) When it is judged in step S158 that $S_i=\{\phi\}$, i is removed from P (step S159).

(10) Subsequently, it is judged whether P={$\phi$} (step S160).

(11) When it is judged in step S160 that the equation P={$\phi$} is not satisfied, the processing returns to step S152. When it is judged in step S160 that P={$\phi$}, the calculation is ended.

In the above-described manner, the route calculation is completed.

The present embodiment can be modified in the following manners.

(1) Interchanges may be located while search angles are specified without setting search areas.

(2) Search areas may be set in an arbitrary manner insofar as the search areas do not extend in the direction opposite the direction toward a destination.

Figure 21:
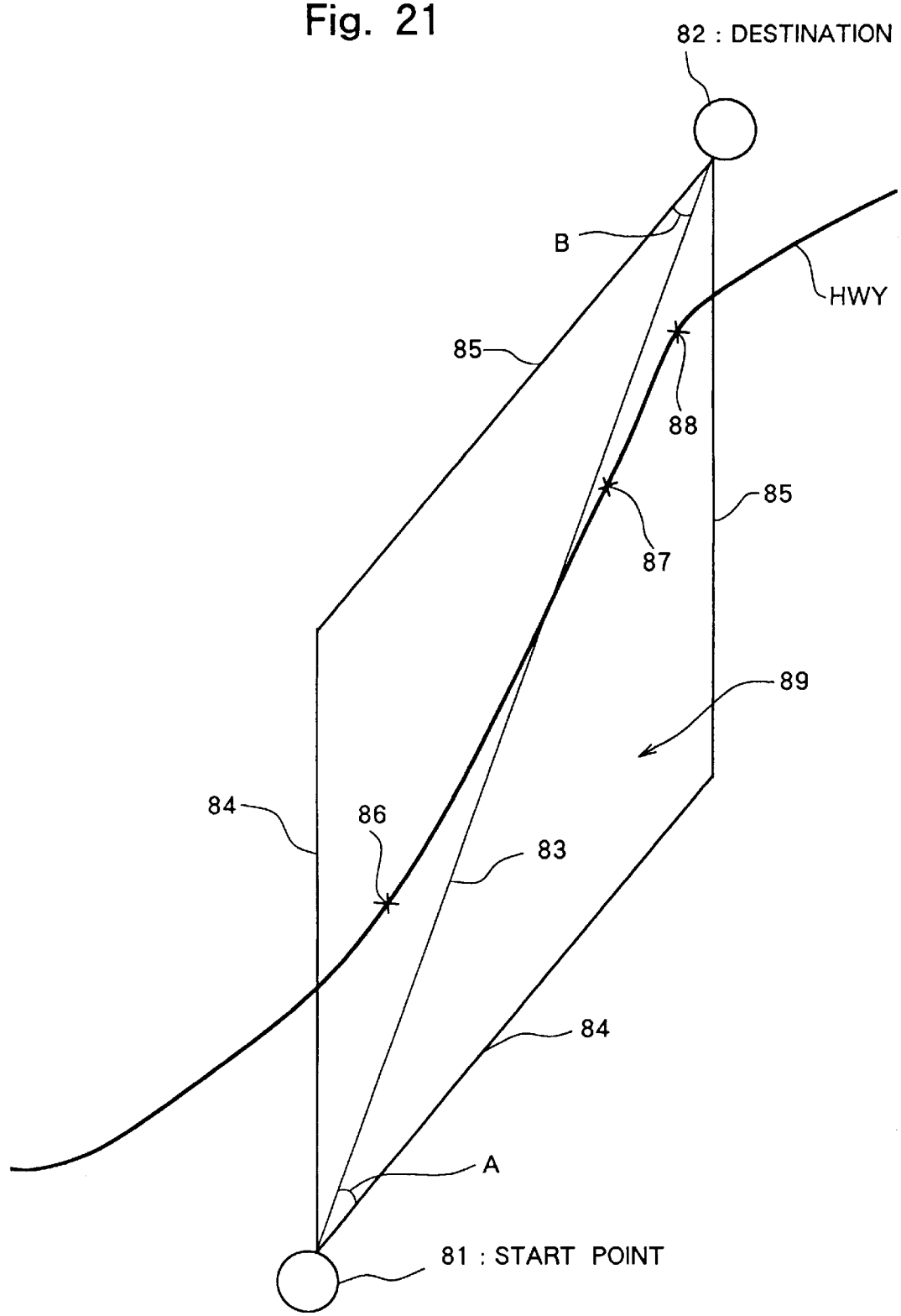
FIG. 21 is an explanatory diagram showing a second method for selecting interchanges of the special road according to the embodiment of the present invention.

(3) In order to set areas and angles for locating ICs, a method shown in FIG. 21 may be employed. As shown in FIG. 21, using a line 83 connecting a start point 81 and a destination 82 as a reference line, there are determined an area that extends from the start point 81 and that is sandwiched between lines 84 intersecting the line 83 at a predetermined angle A (e.g., 30°) and an area that extends from the destination 82 and is sandwiched between lines 85 intersecting the line 83 at a predetermined angle B (e.g., 30°). In this manner, the areas and angles used for locating ICs are simultaneously set. Subsequently, interchanges 86, 87, and 88 located in the areas 89 are regarded as candidates for $S_{IC}$ and $D_{IC}$.

(4) In the processing for expanding search areas performed in steps S134 and S138 in FIG. 23, the degree of extension may be increased instead of increasing the predetermined angles A and B.

(5) In the present embodiment, when interchanges of a special road are designated, road segments other than the road segment between the located interchange of the special road are multiplied by a modification factor, thereby carrying out weighting processing in order to increase their costs. However, this processing may be modified such that the cost of the road segment between the designated interchanges of the special road is decreased by multiplying it by a modification factor.

The present invention is not limited to the above-described embodiments. Numerous modifications and variations of the present invention are possible in light of the spirit of the present invention, and they are not excluded from the scope of the present invention.

The entire disclosures of Japanese Patent Applications No. 8-139834 filed on Jun. 3, 1996 and No. 8-198172 filed on Jul. 26, 1996 including specifications, drawings, and abstracts are incorporated herein by reference in their entirety.

What is claimed is:

1. A navigation apparatus for a vehicle which provides route guidance based on a preset route, comprising:

information storage means in which map information is stored;

present position detection means for detecting the present position of a vehicle;

input means for inputting a start point, a destination and an enroute point and for designating, as a determination mode, an ordinary-road-preferential mode or a toll-road-preferential mode;

route determination means for determining a route based on the map information stored in said information storage means and the determination mode input by said input means, the route starting from the present position of the vehicle detected by said present position detection means or the start point input by said input means and reaching the enroute point or the destination input by said input means; and control means for providing route guidance based on the route determined by said route determination means, wherein when the vehicle has deviated from a route determined in the ordinary-road-preferential mode and starts traveling on a toll road while route guidance is being provided based on the determined route, said route determination means determines a new route to the destination or the enroute point after changing the determination mode from the ordinary-road-preferential mode to the toll-road-preferential mode.

2. A navigation apparatus for a vehicle which provides route guidance based on a preset route, comprising:

information storage means in which map information is stored;

present position detection means for detecting the present position of a vehicle;

input means for inputting a start point, a destination and an enroute point and for designating, as a determination mode, an ordinary-road-preferential mode or a toll-road-preferential mode;

route determination means for determining a route based on the map information stored in said information storage means and the determination mode input by said input means, the route starting from the present position of the vehicle detected by said present position detection means or the start point input by said input means and reaching the enroute point or the destination input by said input means; and control means for providing route guidance based on the route determined by said route determination means, wherein when the vehicle has deviated from a route determined in the toll-road-preferential mode and starts traveling on an ordinary road while route guidance is being provided based on the determined route, said route determination means determines a new route to the destination or the enroute point after changing the determination mode from the toll-road-preferential mode to the ordinary-road-preferential mode.

3. A navigation apparatus for a vehicle according to claim 2, wherein when a new route obtained through redetermination in the ordinary-road preferential mode is such that the distance to the enroute point or the destination is equal to or greater than a predetermined distance, route redetermination is carried out after the determination mode is changed to the toll-road-preferential mode.

4. A navigation apparatus for a vehicle, in which a route is determined in an ordinary-road-preferential mode or a toll-road-preferential mode, and route guidance is provided based on the thus-determined route, said navigation apparatus comprising:

route redetermination means for redetermining a route in the toll-road-preferential mode or in the ordinary-road preferential mode; and distance calculation means for, when the redetermined route includes a toll road, calculating the distance between the present position of the vehicle and an interchange for entering the toll road, wherein when the distance calculated by said distance calculation means is equal to or greater than a predetermined value, route redetermination is carried out in the ordinary-road-preferential mode.

5. A navigation apparatus for a vehicle, in which a route is determined in an ordinary-road-preferential mode or a toll-road-preferential mode, route guidance is provided based on the thus-determined route, and when the vehicle travles along a road which is a deviation from the determined route, redetermination is conducted so as to obtain a new route, based on which guidance is provided, said navigation apparatus comprising:

first route determination means for carrying out route determination in the toll-road-preferential mode;

second route determination means for carrying out route determination in the ordinary-road-preferential mode;

search cost calculation means for, when the vehicle leaves a toll road during travel along a route determined by said first route determination means and starts traveling along an ordinary road, performing route determination in both the ordinary-road-preferential mode and the toll-road-preferential mode, and calculating search costs of the routes determined in the two modes; and search cost comparison means for comparing the search costs of the two routes calculated by said search cost calculation means, wherein one of the ordinary-road-preferential mode and the toll-road-preferential mode is selected based on the result of the comparison carried out by said search cost comparison means.

6. A navigation apparatus for a vehicle according to claim 5, wherein a necessary time for travel of a route determined in the ordinary-road-preferential mode and a necessary time for travel of a route determined in the toll-road-preferential mode are calculated, and when the necessary travel time of the route determined in the ordinary-road-preferential mode is shorter than a time that is obtained by multiplying the necessary travel time of the route determined in the toll-road-preferential mode by a predetermined factor, the route determined in the ordinary-road-preferential mode is used as a new route.

7. A navigation apparatus for a vehicle according to claim 5, wherein the ratio of the length of a toll road to the total length of a new route obtained by redetermination in the toll-road-preferential mode is calculated, and when the ratio is equal to or less than a predetermined value, a route determined in the ordinary-road-preferential mode is used as a new route.

8. A navigation apparatus for a vehicle, in which a route is determined in an ordinary-road-preferential mode or a toll-road-preferential mode, route guidance is provided based on the thus-determined route, and when the vehicle has deviated from the determined route, redetermination is conducted so as to obtain a new route based on which guidance is provided, said navigation apparatus comprising:

first route determination means for carrying out route determination in the toll-road-preferential mode;

second route determination means for carrying out route determination in the ordinary-road-preferential mode; and information collecting means for collecting traffic information, wherein when the vehicle leaves a toll road at an interchange during travel along a route that has been determined by said first route determination means and starts traveling along an ordinary road, responsive to receipt of traffic information pertaining to a location on the toll road ahead of the interchange, route redetermination is carried out in the ordinary-road-preferential mode.

9. A navigation apparatus for a vehicle, in which a route is determined in an ordinary-road-preferential mode or a toll-road-preferential mode, and route guidance is provided based on the thus-determined route, said navigation apparatus comprising:

first necessary time calculation means for calculating a time required for travel to a destination when a route determined in the ordinary-road-preferential mode is used; and second necessary time calculation means for calculating a time required for travel to the destination when a route determined in the toll-road-preferential mode is used, wherein when the necessary time for travel of the route determined in the ordinary-road-preferential mode is shorter than a time that is obtained by multiplying the necessary time for travel of the route determined in the toll-road-preferential mode by a predetermined factor, route redetermination is carried out in the ordinary-road-preferential mode so as to obtain a new route.

10. A navigation apparatus for a vehicle, in which a route is determined in an ordinary-road-preferential mode or a toll-road-preferential mode, and route guidance is provided based on the thus-determined route, said navigation apparatus comprising:

route determination means for determining a first new route in the toll-road-preferential mode; and ratio calculation means for calculating the ratio of the length of a toll road to the total length of the new route that is determined by the route determination means in the toll-road-preferential mode, wherein when the ratio calculated by said ratio calculation means is equal to or less than a predetermined value, route redetermination is carried out in the ordinary-road-preferential mode so as to obtain a second new route.

11. A navigation apparatus for a vehicle which provides route guidance based on a preset route, comprising:

present position detection means for detecting the present position of a vehicle;

input means for inputting a start point, a destination and an enroute point;

information storage means for storing data including search road data to which weights for route determination are given;

interchange search range setting means for setting search ranges that extend from the start point and the destination, respectively, within predetermined angular ranges, based on a positional relationship between the start point and the destination;

interchange search means for selecting, from said information storage means, interchanges of a special road located within the interchange search ranges set by said interchange search range setting means;

weight changing means for changing the weight of search road data for a segment of the special road defined by the selected interchanges; and route determination means for determining a route based on the search road data as changed by said weight changing means.

12. A navigation apparatus for a vehicle according to claim 11, wherein when no interchange has been selected, route determination is carried out in a mode in which priority is given to ordinary roads, and it is automatically judged whether priority is given to special roads or not.

13. A navigation apparatus for a vehicle according to claim 11, wherein the predetermined angle range at the start point is determined such that it is sandwiched between two lines which are located on opposite sides of a straight line connecting the start point and the destination and each of which intersects the start point at a predetermined angle with respect to the straight line, and the predetermined angle range at the destination is determined such that it is sandwiched between two lines which are located on opposite sides of the straight line, each of which intersects the destination at a predetermined angle with respect to the straight line.

14. A navigation apparatus for a vehicle according to claim 13, wherein the predetermined angle is an angle equal to or less than 90 degrees.

15. A navigation apparatus for a vehicle according to claim 11, wherein a predetermined area is set in advance, it is judged whether the area includes a special road having interchanges, and when it is judged that the area includes the special road, the interchanges are searched for route determination.

16. A navigation apparatus for a vehicle which provides route guidance based on a preset route, comprising:

present position detection means for detecting the present position of a vehicle;

input means for inputting a start point, a destination and an enroute point;

information storage means for storing data including search road data to which weights for route determination are given;

interchange search range setting means for setting search ranges that extend from the start point and the destination, respectively, within predetermined angular ranges, based on a positional relationship between the start point and the destination;

interchange search means for locating, from the search road data stored in said information storage means, interchanges of a special road located within the interchange search ranges set by said interchange search range setting means;

interchange designation means for designating, among the interchanges located by said interchange search means, an optimal interchange for the vehicle to enter the special road after leaving the start point and an optimal interchange for the vehicle to exit the special road so as to reach the destination; and route determination means for determining a route by using the interchanges designated as optimal by the interchange designation means.

17. A navigation apparatus for a vehicle which provides route guidance based on a preset route, comprising:

present position detection means for detecting the present position of a vehicle;

input means for inputting a start point, a destination and an enroute point;

information storage means for storing data including search road data to which weights for route determination are given;

interchange search range setting means for setting search ranges that extend from the start point and the destination, respectively, within predetermined angular ranges, based on a positional relationship between the start point and the destination;

interchange search area setting means for setting areas included within the interchange search ranges set by said interchange search range setting means;

interchange search means for locating, from the search road data stored in said information storage means, interchanges of a special road located within the interchange search areas set by said interchange search area setting means;

interchange designation means for designating, among the interchanges located by said interchange search means, an optimal interchange for the vehicle to enter the special road after leaving the start point and an optimal interchange for the vehicle to exit the special road so as to reach the destination; and route determination means for determining a route by using the interchanges designated as optimal by the interchange designation means.

18. A navigation apparatus for a vehicle according to claim 17, wherein said interchange search area setting means sets semicircular areas, the semicircular areas each having a predetermined radius and centered at the start point and the destination, respectively, and having reference lines that are perpendicular to a line connecting the start point and the destination and that pass through the start point and the destination, respectively.

19. A navigation apparatus for a vehicle according to claim 17, wherein said interchange search area setting means sets an area sandwiched between two lines which are parallel to lines respectively intersecting a start point and a destination at right angles with respect to a line connecting the start point and the destination and which are respectively separated from the start point and the destination by a predetermined amount.

* * * * *